(12) United States Patent
Tricoli et al.

(10) Patent No.: US 10,500,812 B2
(45) Date of Patent: Dec. 10, 2019

(54) FILM

(71) Applicant: The Australian National University, Acton, Australian Capital Territory (AU)

(72) Inventors: Antonio Tricoli, O'Connor (AU); David Russell Nisbet, Palmerston (AU)

(73) Assignee: The Australian National University, Acton, Australian Capital Territory (AU)

( * ) Notice: Subject to any disclaimer, the term of this patent is extended or adjusted under 35 U.S.C. 154(b) by 295 days.

(21) Appl. No.: 15/128,484

(22) PCT Filed: Mar. 24, 2015

(86) PCT No.: PCT/AU2015/000170
§ 371 (c)(1),
(2) Date: Sep. 23, 2016

(87) PCT Pub. No.: WO2015/143481
PCT Pub. Date: Oct. 1, 2015

(65) Prior Publication Data
US 2017/0100912 A1    Apr. 13, 2017

(30) Foreign Application Priority Data

Mar. 24, 2014 (AU) .............................. 2014901036

(51) Int. Cl.
*B32B 5/02* (2006.01)
*D01D 5/00* (2006.01)
(Continued)

(52) U.S. Cl.
CPC ............... *B32B 5/02* (2013.01); *B32B 5/022* (2013.01); *B32B 5/08* (2013.01); *B32B 5/26* (2013.01);
(Continued)

(58) Field of Classification Search
None
See application file for complete search history.

(56) References Cited

U.S. PATENT DOCUMENTS 5,395,305 A    3/1995 Koide et al.
8,679,580 B2   3/2014 Lu et al.
(Continued)

OTHER PUBLICATIONS

International Search Report dated Jun. 3, 2015—3 pages.
(Continued)

*Primary Examiner* — Chinessa T. Golden
(74) *Attorney, Agent, or Firm* — Dority & Manning, P.A.

(57) ABSTRACT

The present invention provides a film for attaching a nanostructured material to a surface of a substrate, comprising: (a) a removable support; (b) an attaching layer for attaching the film to the surface of a substrate; and (c) the material directly coupled to the support and the attaching layer. Methods for making the film, methods for attaching the material to the surface of a substrate are also provided. The present invention further provides a surface having a material attached thereto by means of the attaching layer. Using the methods disclosed herein, a material having a high specific surface area (SSA) and having particular properties (e.g. super-hydrophobicity) can be applied to a substrate including a fuel cell, a conductive electrode, a dye sensitized solar cell, a diffuse reflective mirror, eyewear, a window and a vehicle (e.g. car) windscreen, for example to provide a self-cleaning surface.

20 Claims, 22 Drawing Sheets

Polypropylene (PP)

Polystyrene (PS)

Polyvinyl alcohol (PVA)

(51) Int. Cl.
*B32B 5/08* (2006.01)
*B32B 5/26* (2006.01)
*B32B 7/06* (2019.01)
*B32B 27/08* (2006.01)
*B32B 27/12* (2006.01)
*B32B 27/18* (2006.01)
*B32B 27/30* (2006.01)
*B32B 27/32* (2006.01)
*B32B 27/06* (2006.01)
*B32B 37/00* (2006.01)
*B32B 37/06* (2006.01)
*B32B 38/10* (2006.01)
*B32B 15/20* (2006.01)
*B32B 37/26* (2006.01)
*B32B 37/24* (2006.01)
*B82Y 30/00* (2011.01)

(52) U.S. Cl.
CPC ............... *B32B 7/06* (2013.01); *B32B 15/20* (2013.01); *B32B 27/06* (2013.01); *B32B 27/08* (2013.01); *B32B 27/12* (2013.01); *B32B 27/18* (2013.01); *B32B 27/30* (2013.01); *B32B 27/304* (2013.01); *B32B 27/32* (2013.01); *B32B 27/322* (2013.01); *B32B 37/025* (2013.01); *B32B 37/06* (2013.01); *B32B 38/10* (2013.01); *D01D 5/0007* (2013.01); *B32B 37/26* (2013.01); *B32B 2037/243* (2013.01); *B32B 2255/10* (2013.01); *B32B 2255/20* (2013.01); *B32B 2255/26* (2013.01); *B32B 2262/023* (2013.01); *B32B 2262/0223* (2013.01); *B32B 2262/0276* (2013.01); *B32B 2262/14* (2013.01); *B32B 2307/412* (2013.01); *B32B 2307/7166* (2013.01); *B32B 2307/728* (2013.01); *B32B 2307/73* (2013.01); *B32B 2307/748* (2013.01); *B32B 2405/00* (2013.01); *B32B 2457/00* (2013.01); *B32B 2457/12* (2013.01); *B32B 2457/18* (2013.01); *B32B 2551/00* (2013.01); *B32B 2551/08* (2013.01); *B82Y 30/00* (2013.01)

(56) References Cited

U.S. PATENT DOCUMENTS

| 2007/0148531 | A1* | 6/2007 | Yoshizawa | H01M 4/8605 |
| | | | | 429/492 |
| 2008/0020261 | A1* | 1/2008 | Hendricks | H01M 4/8636 |
| | | | | 429/431 |
| 2010/0159366 | A1* | 6/2010 | Shao-Horn | H01G 11/36 |
| | | | | 429/532 |
| 2010/0183950 | A1 | 7/2010 | Dai | |
| 2011/0294037 | A1 | 12/2011 | Ji et al. | |
| 2013/0330501 | A1* | 12/2013 | Aizenberg | B08B 17/06 |
| | | | | 428/85 |

OTHER PUBLICATIONS

English Translation of JP2012-171958, 15 pages.
Borysiewicz, "Nanocoral ZnO Films Fabricated on Flexible Poly(Vinyl Chloride) Using a Carrier Substrate", Thin Solid Films, vol. 550, Oct. 29, 2013, pp. 145-148.
Cebeci et al., "Nanoporosity-driven superhydrophilicity: A means to create multifunctional antifogging coatings", Langmuir, 2006, 22(6), pp. 2856-2862.
Gan et al., "Novel TiO2 thin film with non-UV activated superwetting and antifogging behaviours", Journal of Materials, 2007, 17(10), pp. 952-954.
Lee et al., "Developing Protective Textile Materials as Barriers to Liquid Penetration Using Melt-Electrospinning", Journal of Applied Polymer Science, 2006, 102, pp. 3430-3437.
Li et al., "Self-Cleaning Antireflective Coatings Assembled from Peculiar Mesoporous Silica Nanoparticles", Langmuir, 2010, 26(16), pp. 13528-13534.
Nisbet et al., "Colloid and Surfaces B-Biointerfaces", Surface and bulk characterisation of electrospun membranes: Problems and improvements, 2009, 71(1), pp. 1-12.
Patel et al., "Superhydrophilic Surfaces for Antifogging and Antifouling Microfluidic Devices", The Association of Laboratory Automation, Apr. 2010, pp. 114-119.
Tricoli et al., "Anti-Fogging Nanofibrous SiO2 and Nanostructured SiO2—TiO2 Films Made by Rapid Flame Dseposition and In Situ Annealing", Langmuir, 2009, 25(21), pp. 12578-12584.
Tricoli et al., "Highly porous TiO2 films for dye sensitized solar cells", J. Mater. Chem., 2012, 22, pp. 14254-14261.
Zhang et al., "Self-Cleaning Particle Coating with Antireflection Properties", Chem. Mater, 2005, 17, pp. 696-700.

* cited by examiner

Polypropylene (PP)

Polystyrene (PS)

Polyvinyl alcohol (PVA)

Polyvinyl chloride (PVC) = attaching layer material

Polyvinyl pyrrolidine (PVP) = support

Attached          Detached

| Precursors | Water Induced Release | Peel Off Release |
|---|---|---|
| Mn(acac) in acetonitrile (30ml) | 144° ± 11° | 138° ± 5° |
| Mn(acac) in acetonitrile (50ml) | 149° ± 7° | 149° ± 7° |
| Mn(acac) in acetonitrile (80ml) | 147° ± 12° | 157° ± 3° |
| Zn(Nph) in xylene (50ml) | 158° ± 2° | 163° ± 5°<br><br>157° ± 4° (On Paper Substrate) |

Attaching Layer
Material
Support

1) Layers transferred to substrate via heat and pressure (optional).

2) Removal of backing layer via dissolution of support, revealing material.

FILM

RELATED APPLICATIONS

This application is the U.S. National Stage entry of International Application Number PCT/AU2015/000170 filed under the Patent Cooperation Treaty and having a filing date of Mar. 24, 2015, which claims priority to Australian Application No. 2014901036 having a filing date of Mar. 24, 2014, all of which are hereby incorporated by reference herein in their entirety for all purposes.

FIELD

The present invention relates to the field of coatings, and specifically to a means for applying a coating to a surface.

BACKGROUND

This application claims priority from Australian provisional application 2014 901036 (filed on 24 Mar. 2014), the entirety of which is incorporated by reference.

Incorporated herein by reference in its entirety is the Australian provisional application entitled "Mesh", filed on 24 Mar. 2015 and having the Australian National University as the Applicant and Vincent Craig, David Russell Nisbet, Antonio Tricoli, and William Wong Sai Yau as Inventors.

In many applications it is necessary to apply a coating to a surface. In some instances it would be desirable to form the coating independently of the surface and then apply the coating to the surface in a separate step. This is however not always practicable using currently available technology. This is particularly so when the coating is a nanostructured coating, as such coatings are commonly fragile.

For example, high specific surface area (SSA) films may be used for various purposes, e.g. super-hydrophobic coatings. Super-hydrophobic or super-hydrophilic coatings are often extremely mechanically fragile. Therefore such coatings are commonly prepared by directly forming the coating on a substrate.

A disadvantage of prior art processes in which a coating is assembled on a substrate is that such processes commonly require large infrastructure such as furnaces and chemical/physical vapour deposition facilities. A further disadvantage of assembling a coating on a substrate is that the mechanical and chemical properties of the coating cannot be optimised independently from the final properties of the substrate. The present invention aims to address one or both of these disadvantages.

The potential applications of the present invention are very widespread, from nanostructured coatings for fuel cells, conductive electrodes (e.g. transparent conductive electrodes), dye sensitized solar cells and diffuse reflective mirrors, to bio-compatible coatings to promote cell growth and transparent coatings for controlled wetting properties. Potential applications also include microfluidic devices.

Regarding super-hydrophobicity, in nature, the most renowned example of super-hydrophobicity belongs to that of Nelumbo, the lotus plant from which the "lotus leaf effect" is named, albeit the presence of a multitude of biological variants. More recently, Rosa, the rose was also found to exhibit super-hydrophobic behaviours. However, unlike the low adhesion super-hydrophobicity demonstrated by the lotus leaf, the rose petal exhibits highly adhesive super-hydrophobic properties (the "rose petal effect").

In many instances it is not convenient or even feasible to produce nanostructured surfaces on a desired substrate. It would therefore be desirable to be able to transfer a nanostructured layer from the substrate on which it was formed to a substrate on which it is to be used. However such transfer is difficult due to the generally fragile nature of such layers.

There is therefore a need for a simple, preferably scalable, process for transferring a preformed nanostructured layer onto a target substrate.

SUMMARY OF INVENTION

In a first aspect, there is provided a film for attaching a nanostructured material to a surface of a substrate comprising:
(a) a removable support;
(b) an attaching layer for attaching the film to the surface of a substrate; and
(c) the material directly coupled to the attaching layer.

The following options may be used either individually or in any suitable combination:

The support may be soluble in a solvent which does not dissolve the material. The support may be water soluble. It may comprise (or may consist essentially of, e.g. may consist of) polyvinyl alcohol (PVA). It may comprise (or may consist essentially of, e.g. may consist of) polyvinyl pyrrolidine (PVP). It may therefore be removable by dissolution.

The support may be removable by a mechanical process, e.g. peeling, abrading or laser ablation.

The support may be in the form of a layer. The material may be in the form of a layer. In this latter case the material may be disposed between the support and the attaching layer. Both the support and the material may be in the form of layers.

In an alternative, the material may be disposed in and/or on the support. The material and the support may be intermixed, optionally intermixed as a layer, and disposed on the attaching layer. The material and support may each be in the form of fibres. In this case fibres of each may be optionally interwoven. They may be interpenetrating.

The attaching layer may have a lower melting or a lower softening point than the material. The attaching layer may be insoluble in a solvent in which the support is soluble. For example, the attaching layer may comprise (or may consist essentially of, e.g. may consist of) a polyolefin. The attaching layer may comprise (or may consist essentially of, e.g. may consist of) polypropylene (PP). The PP may have an average molecular weight of 40,000-400,000. Alternatively, for example, the attaching layer may comprise (or may consist essentially of, e.g. may consist of) a halogenated polyolefin (such as a polyvinyl halide, e.g. polyvinyl chloride (PVC)). The PVC may have an average molecular weight of 40,000-400,000.

In an embodiment, the material comprises (or consists essentially of, e.g. consists of) polystyrene (PS).

The material may be nanostructured. It may comprise (or may consist essentially of, e.g. may consist of) any one or more of nanofibres, nanosheets, nanoparticles, carbon nanotubes, agglomerates, fractals, nano-dots, graphene sheets or three-dimensional nanostructures. For example, the material may comprise (or may consist essentially of, e.g. may consist of) nanofibres or nanoparticles, e.g. nanofibres. It may have a high specific surface area (SSA), such as an SSA of 1 $m^2$/g or greater. It may have a porosity of 30% or greater (e.g. 50% or greater). It may be super-hydrophobic or may be super-hydrophilic. It may be in the form of a layer having a thickness of 200 nm or less, or 500 um or less. It may be transparent. It may be sufficiently thin as to be transparent to visible light. It may be 400 nm or less thick. It may for example consist of PS nanofibres which make up a material having a high SSA and particular properties (e.g. super-hydrophobicity). It may be bio-compatible.

The film may optionally be free-standing.

In one embodiment the film comprises:
(a) a removable support;
(b) an attaching layer for attaching the film to the surface of a substrate; and
(c) the material disposed between the support and the attaching layer.

In one embodiment the film comprises:
(a) a removable support;
(b) an attaching layer for attaching the film to the surface of a substrate; and
(c) the material disposed between the support and the attaching layer;
wherein the removable support is soluble in a solvent (e.g. an aqueous solvent) and the attaching layer and the material are not soluble in the solvent.

In another embodiment the film comprises:
(a) a removable support;
(b) an attaching layer for attaching the film to the surface of a substrate; and
(c) the material disposed between the support and the attaching layer;
wherein the removable support is soluble in a solvent (e.g. an aqueous solvent) and the attaching layer and the material are not soluble in the solvent; and wherein the material has a high SSA (e.g. 1 $m^2/g$ or greater, e.g. 2 $m^2/g$ or greater, e.g. 5 $m^2/g$ or greater, e.g. 10 $m^2/g$ or greater).

In another embodiment the film comprises:
(a) a removable support;
(b) an attaching layer for attaching the film to the surface of a substrate; and
(c) the material disposed between the support and the attaching layer;
wherein the removable support is soluble in a solvent (e.g. an aqueous solvent) and the attaching layer and the material are not soluble in the solvent; and wherein the material has a high SSA (e.g. 1 $m^2/g$ or greater, e.g. 2 $m^2/g$ or greater, e.g. 5 $m^2/g$ or greater, e.g. 10 $m^2/g$ or greater). The material having a high SSA may have super-hydrophobic properties. It may comprise (or may consist essentially of, e.g. may consist of) any one or more of nanofibres, nanosheets, nanoparticles, carbon nanotubes, agglomerates, fractals, nano-dots, graphene sheets or three-dimensional nanostructures. For example, the material may comprise (or may consist essentially of, e.g. may consist of) nanofibres or nanoparticles, e.g. nanofibres.

In another embodiment the film comprises:
(a) a removable support comprising (or consisting essentially of, e.g. consisting of) PVA;
(b) an attaching layer comprising (or consisting essentially of, e.g. consisting of) a polyolefin (e.g. PP) for attaching the film to the surface of a substrate; and
(c) the material disposed between the support and the attaching layer comprising PS; wherein the removable support is soluble in a solvent (e.g. an aqueous solvent) and the attaching layer and the material are not soluble in the solvent; and wherein the material has a high SSA (e.g. 1 $m^2/g$ or greater, e.g. 2 $m^2/g$ or greater, e.g. 5 $m^2/g$ or greater, e.g. 10 $m^2/g$ or greater). The material having a high SSA may have super-hydrophobic properties. It may comprise (or may consist essentially of, e.g. may consist of) any one or more of nanofibres, nanosheets, nanoparticles, carbon nanotubes, agglomerates, fractals, nano-dots, graphene sheets or three-dimensional nanostructures. For example, the material may comprise (or may consist essentially of, e.g. may consist of) nanofibres or nanoparticles, e.g. nanofibres.

In a further embodiment the film comprises:
(a) a removable support comprising (or consisting essentially of, e.g. consisting of) PVP;
(b) an attaching layer comprising (or consisting essentially of, e.g. consisting of) a halogenated polyolefin (such as a polyvinyl halide (e.g. PVC)) for attaching the film to the surface of a substrate; and
(c) the material disposed between the support and the attaching layer comprising PS;
wherein the removable support is soluble in a solvent (e.g. an aqueous solvent) and the attaching layer and the material are not soluble in the solvent; and wherein the material has a high SSA (e.g. 1 $m^2/g$ or greater, e.g. 2 $m^2/g$ or greater, e.g. 5 $m^2/g$ or greater, e.g. 10 $m^2/g$ or greater). The material having a high SSA may have super-hydrophobic properties. It may comprise (or may consist essentially of, e.g. may consist of) any one or more of nanofibres, nanosheets, nanoparticles, carbon nanotubes, agglomerates, fractals, nano-dots, graphene sheets or three-dimensional nanostructures. For example, the material may comprise (or may consist essentially of, e.g. may consist of) nanofibres or nanoparticles, e.g. nanofibres.

The relative placement of the layers described in the above embodiments may be changed e.g. the material may be in the form of a layer at least partly within the support and in contact with the attaching layer. The attaching layer can, for example, melt or soften and percolate through the support or functional layer (i.e. material) reaching the surface so as to attach the film to the surface. This option may have some advantages if the attaching layer is made of some materials that improve the functionality of the functional material.

This system is not limited to polymers, as other materials, e.g. inorganic materials, may be used with the same concept. There is a large set of available inorganic material that could be utilized. $TiO_2$, ZnO and $SiO_2$ could be utilized for the material in order to provide hydrophilic coatings, for example. A further example is manganese oxide. Proteins or other biological substances may be used as the material in order, for example, to provide a bio-compatible coating. Copper nanoparticles could be used for the attaching layer, for example.

In one embodiment, one or both of the support and the attaching layer is nanostructured. For example, one or both of the support and the attaching layer may comprise (e.g. may consist essentially of, e.g. may consist of) any one or more of nanofibres, nanosheets, nanoparticles, carbon nanotubes, agglomerates, fractals, nano-dots, graphene sheets or three-dimensional nanostructures. One or both of the support and the attaching layer may comprise (or may consist essentially of, e.g. may consist of) nanofibres or nanoparticles, e.g. nanofibres. The material may comprise (or may consist essentially of, e.g. may consist of) nanofibres or nanoparticles, e.g. nanofibres.

In one embodiment, the support, the attaching layer and the material are each nanostructured. For example, each layer independently may comprise (e.g. may consist essentially of, e.g. may consist of) nanofibres, nanosheets, nanoparticles or three-dimensional nanostructures, e.g. nanofibres or nanoparticles, e.g. nanofibres.

In a second aspect, there is provided a process for making a film according to the first aspect. The method comprises providing a support having a nanostructured material therein and/or thereon and depositing an attaching layer thereon. The support may be in the form of a film or layer, and the depositing of the attaching layer may be on to one, commonly only one, face or side of the support. The depositing may be such that the deposited attaching layer abuts the nanostructured material.

The method may comprise providing a support, forming a nanostructured material on and/or in the support and depositing an attaching layer onto the material. The providing of the support may comprise forming a reinforcement layer on a backing layer. The reinforcement layer and the backing layer may, in combination, represent a support. The forming may comprise electrospinning. The method may further comprise the step of removing the backing layer, for example removal by mechanical means (e.g. peeling, abrading or laser ablation).

The method may alternatively comprise forming together a nanostructured material and a support (e.g. by coextrusion, coaxial electrospinning or using multiple nozzles simultaneously); and then depositing an attaching layer onto the material.

The following options may be used either individually or in any suitable combination:

The nanostructured material may comprise (e.g. consist essentially of, e.g. consist of) any one or more of nanofibres, nanosheets, nanoparticles, carbon nanotubes, agglomerates, fractals, nano-dots, graphene sheets or three-dimensional nanostructures. For example, the material may comprise (or may consist essentially of, e.g. may consist of) nanofibres or nanoparticles, e.g. nanofibres. The step of forming the material may comprise a step selected from the group consisting of: electrospinning, nanoparticle aerosol deposition, monolayer self-assembly, layer-by-layer synthesis, sputtering, sol-gel, wet-synthesis and spray pyrolysis. In particular it may comprise electrospinning.

The step of forming any one, optionally two or all, of the material, the support and the attaching layer may comprise a step selected from the group consisting of: electrospinning, nanoparticle aerosol deposition, monolayer self-assembly, layer-by-layer synthesis, sputtering, sol-gel, wet-synthesis and spray pyrolysis. In particular it may comprise electrospinning. The film of the first aspect may be made by the process of the second aspect.

A third aspect of the invention is directed to a method of attaching a nanostructured material to a surface, the method comprising applying a layer comprising the material and a support to the surface, causing the material to attach to the surface and then removing the support; wherein the attachment is effected by means of an attaching layer.

The method may comprise (i) applying the film of the first aspect onto the surface, such that the attaching layer abuts said surface, and causing the attaching layer to attach to said surface.

Alternatively the method of attaching a nanostructured material to a surface, may comprise (ii) the steps of:
(a) applying a film comprising the material and a support to an attaching layer, so that the material abuts said attaching layer, wherein the attaching layer is disposed on the surface of a substrate; and
(b) causing the attaching layer to attach to said material.

In variation (ii), the support, attaching layer and material may be as defined in the first aspect, except that they are arranged in an alternative arrangement wherein the attaching layer is disposed on the surface rather than on the material.

The causing in either method (i) or method (ii) may comprise applying heat (so that the attaching layer softens and/or melts) and/or radiation (e.g. visible light, UV or X-ray) and/or a chemical agent, either directly or indirectly to the attaching layer so as to attach the material to the surface. The steps of applying the film onto the surface and of causing the attaching layer to attach may be consecutive or may be parallel steps. The method wherein the attaching layer is PP may comprise heating the film to at least about 130° C. until it softens. The method wherein the attaching layer is PVC may comprise heating the film to at least about 60° C. (e.g. about 80° C., e.g. about 100° C.) until it softens.

Other methods to induce attaching of the attaching layer are also contemplated. For example, irradiation or chemical reaction. For example the attaching layer may comprise a substance (e.g. metallic particles) capable of being heated locally (e.g. by microwaves) so as to soften the substrate locally and cause attachment.

The method may further comprise the step of removing the support after attaching the attaching layer to the surface.

The step of removing the support may comprise dissolution using a solvent, preferably one that does not dissolve the material under the conditions of the dissolution e.g. an aqueous solvent. In one embodiment, the dissolution step may comprise heating (e.g. to about 80° C., e.g. about 70° C., about 60° C., about 50° C., about 40° C., about 30° C.). In one embodiment, the dissolution step may be carried out at room temperature.

Alternatively the step of removing the support may comprise chemical removal or photochemical degradation of the support. The step of removing the support may comprise a mechanical process (e.g. peeling, abrading or laser ablation).

In a fourth aspect, the invention provides a surface having the film of the first aspect attached thereto by means of the attaching layer of said film.

A fifth aspect of the invention provides a surface having a nanostructured material attached thereto by means of an attaching layer, e.g. a layer of a thermoplastic polymer such as a polyolefin, or e.g. inorganic particles, e.g. copper nanoparticles.

In an embodiment there is provided a surface with an attaching layer disposed thereon, wherein a layer of nanostructured material is disposed on the attaching layer, the surface with the attaching layer and the nanostructured layer being prepared by
(a) providing a removable support;
(b) forming the nanostructured material on the support;
(c) depositing the attaching layer on the nanostructured material; to form a film; and subsequently
(d) applying the film to a surface of a substrate so that the attaching layer abuts the surface;
(e) attaching the film to the surface by means of the attaching layer; and then removing the support.

Steps (d) and (e) may be conducted, concurrently, discretely or partly concurrently or partly discretely. The layer of nanostructured material may be super-hydrophobic or super-hydrophilic.

In a sixth aspect there is provided an article having a material attached thereto, wherein the material is a nanostructured, high SSA layer which is attached to the article by an attaching layer. The article may be selected from a fuel cell, a conductive electrode (e.g. a transparent conductive electrode), a dye sensitized solar cell, a diffuse reflective mirror, eyewear (e.g. a spectacle lens), a window and a car windscreen.

In a seventh aspect there is provided a film comprising a nanostructured, high SSA material and a removable support.

BRIEF DESCRIPTION OF DRAWINGS

FIG. 27A is a Scanning Electron Microscopic Image (8.8 k magnification) of functional PCL layer without the use of DTAB FIG. 27B shows hydrophobic non-wettable behaviour of a PCL nanofibrous functional surface developed without dodecyl trimethyl ammonium bromide (DTAB). The surface was hydrophobic despite the presence of remnant PVP (soluble). This evidently demonstrated the multi-functionality that DTAB imposed on the system.

FIG. 27C is a Scanning Electron Microscopic Image (8.8 k magnification) of functional PCL-DTAB layer.

FIG. 27D shows the "hemi-wicking" behaviour of PCL nanofibrous functional surfaces developed with DTAB.

FIG. 27E shows a Scanning Electron Microscopic Image (8.8 k magnification) of a functional PCL-DTAB super-hydrophilic layer augmented with a layer of as-deposited flame-spray derived nanoparticles with saturated particle-fibre coatings.

FIG. 27F shows the dynamic contact angle response time for a silica-infused PCL layer using FSP with deposition times of 4 minutes.

DETAILED DESCRIPTION

Figure 1:
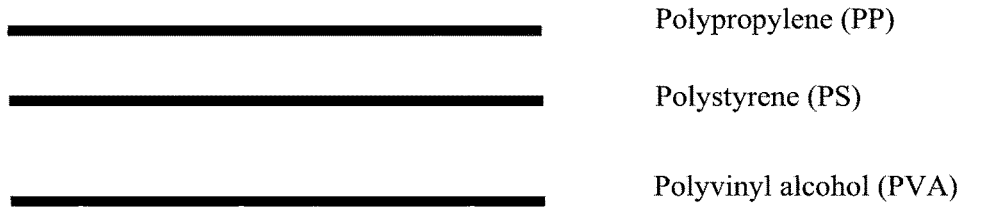
FIG. 1 is a diagram illustrating an example of an assembly of a flexible nanostructured film according to the present invention.

The present invention relates to a film for attaching a nanostructured material to a surface of a substrate. The film is a multilayer (composite) film, comprising a removable support; an attaching layer for attaching the film to the surface of a substrate; and the material directly coupled to the support and the attaching layer.

The term "film" in the present context means a thin (2 cm or less thickness, e.g. 1 cm or less, e.g. 5 mm or less, e.g. 2 mm or less, e.g. 1 mm or less, e.g. 1 um or less, e.g. 100 nm or less) sheet, of any shape (in two dimension, e.g. square, rectangualar, circular, triangular, irregular, etc). The thickness of the sheet may be substantially homogeneous, e.g. may vary by no more than about 10%. The films of the present invention may be flexible. The term "flexible" is understood to mean capable of conforming to the shape of a surface.

The term "thickness" may refer to the mean thickness. The mean thickness may be measured by white light interferometry or ellipsometry or SEM.

The term "attaching" is understood to include adhering, affixing and securing.

The term "surface" includes part or all of a surface.

The term "substrate" is to be broadly construed to include any substrate, item or article or part thereof. The term "substrate" is not size-limited. Examples of suitable substrates include a fuel cell, a conductive electrode (e.g. a transparent conductive electrode), a dye sensitized solar cell, a diffuse reflective mirror, eyewear, a window and a vehicle (e.g. car) windscreen.

The expression "directly coupled to" means in contact with and coupled such that removal of the removable support does not remove the material from the attaching layer. "Coupled to" includes the possibility of a layer of material being disposed between the support and the attaching layer. It also includes interweaving.

When reference is made to a layer "disposed between" other layers, this should not be taken to exclude further intermediate layers. In some embodiments, however, the presence of other, intermediate, layers is excluded i.e. the film may consist of only the three specified layers.

The invention also encompasses films comprising multiples (e.g. 2, 3, 4 or 5) of any one or more of the removable support, the attaching layer and the material. For example the support may itself comprise two or more layers. The support itself may be a bilayer or a multilayer (e.g. a multilayer support having for example 3, 4 or 5 layers).

A bilayer support may comprise a first layer and a second layer. The bilayer or the multilayer support may comprise a backing layer and a reinforcement layer.

An example of a bilayer support is an aluminium sheet and a layer of PVA wherein the PVA is optionally electrospun onto the aluminium sheet and abuts the layer of nanostructured material. The two layers of a bilayer support may be separable and may be removable independently. The backing layer may consist of the aluminium sheet. The reinforcement layer may consist of the layer of PVA.

Another example of a bilayer support is a cellulose-based sheet (e.g. paper such as absorbent paper towel) and a layer of PVP wherein the PVP is optionally electrospun onto the cellulose-based sheet and abuts the layer of material. The two layers of a bilayer support may be separable and may be removable independently. The backing layer may consist of the cellulose-based sheet (e.g. paper such as absorbent paper towel). The reinforcement layer may consist of the layer of PVP.

This invention is not intended to be limited by the number of layers. Other layers can also be present, such as buffer layers or multi-component supporting/attaching/functional layers. These could be also easily fabricated by the same concept. They may result in similar or improved performance.

Each component (i.e. each of the support, the material and the attaching layer) may be created from a different polymer due to the characteristics that different polymers possess on the nano scale.

Alternatively, each of the support, the material and the attaching layer may be made from a different inorganic material. For example, the attaching layer may be metal (e.g. copper), the material may be metal oxide (e.g. titanium oxide, copper oxide, iron oxide, zinc oxide, manganese oxide or magnesium oxide) and the support may be silicon.

Alternatively, the components (i.e. the support, the material and the attaching layer) may each independently be made from polymeric or inorganic material or a mixture thereof.

Material

The term "material" is to be interpreted broadly. It is not limited to a single substance or a fabric. "Material" may refer to, for example, a layer comprising (or consisting essentially of, e.g. consisting of) a polymer (e.g. polystyrene) or an inorganic compound or compounds e.g. $TiO_2$ or ZnO or $SiO_2$. A further example of an inorganic compound is manganese oxide ($Mn_xO_x$). It may comprise a mixture or a blend e.g. a polymer blend or a polymer with included particles e.g. inorganic particles such as $TiO_2$.

The material may be a functional material. The term "functional material" refers not necessarily to the chemical functionality or reactivity of a material but to its possessing a desired function i.e. its purpose. An example of a functional material is a material having a high SSA which may have hydrophobic (e.g. super-hydrophobic) properties. Another example of a functional material is a material having super-hydrophilic properties. Another example of a functional material is a material having super-oleophobic properties.

Thus the material may be any nanostructured material which, when attached to a surface, provides the surface with a desired property (e.g. super-hydrophobicity, self-cleaning, UV absorption, etc). The material may not be self-sustaining i.e. may be such that it could not form a manipulable layer of the desired thickness without a support. It may lack mechanical integrity on its own. The lack of self-sustainability may be due to its fragility (as a result, e.g. of its thinness) or to its not being contiguous. It may for example be, or comprise, a nanoparticulate material.

The melting point of the material may be higher than that of the attaching layer so that the attaching layer can be softened or melted so as to enable attachment of the film to the substrate without melting the material. The term "melt" refers to the thermal liquefaction of crystallites. The material may not be meltable. The decomposition temperature of the material may be higher than the softening point and/or softening point of the attaching layer.

The softening point of the material may be higher than that of the attaching layer so that the attaching layer can be softened so as to enable attachment of the film to the substrate without softening the material.

The softening point may be regarded as the temperature at which the substance can conform to the microstructure of a textured surface so as to allow for physical attachment thereto.

The thickness of the material may be about 1 micrometer (um) or less, about 500 nanometers (nm) or less, for example about 200 nm or less, for example about 100 nm or less; or may be between about 100-1000 nm, or about 100-500 nm, 100-200 nm, 200-1000, 500-1000 or 200-500 nm, e.g. about 100, 200, 300, 400, 500, 600, 700, 800, 100 or 1000 nm, or may in some instances be thicker than this. The ranges "between" two values are understood to include the end points of the specified ranges. The term "thickness" means the average thickness of the layer as a whole. The thickness may be homogeneous (e.g. may not vary by more than about 10%).

The material may be transparent. The term "transparent" is understood to mean capable of transmitting visible light between 400 and 700 nm wavelength. "Transparent" means transmitting more than 80% of incident light between 400 and 700 nm wavelength (optionally more than 70% of incident light between 400 and 700 nm wavelength). Transparency may be measured by UV/vis spectroscopy. This may be due to its thickness (which may be 400 nm or less). The material may be transparent at a specified visible wavelength (e.g. may be transparent at a wavelength of 500 nm). In this case, it may transmit at least 70%, optionally at least 80% of light at that specified wavelength, said wavelength being between about 400 and about 700 nm.

In one embodiment, the material has a high SSA. The high SSA layer may have an SSA of e.g. 1 $m^2/g$ or greater, e.g. 2 $m^2/g$ or greater, e.g. 5 $m^2/g$ or greater, for example 10 $m^2/g$ or greater, for example 15 $m^2/g$ or greater, for example 20 $m^2/g$ or greater, for example 25 $m^2/g$ or greater, for example 50 $m^2/g$ or greater, for example 100 $m^2/g$ or greater. The material having a high SSA may have an SSA of 1 $m^2/g$ or greater and 1000 $m^2/g$ or less, for example 1 $m^2/g$ or greater and 500 $m^2/g$ or less, for example 1 $m^2/g$ or greater and 250 $m^2/g$ or less, 2 $m^2/g$ or greater and 1000 $m^2/g$ or less, for example 2 $m^2/g$ or greater and 500 $m^2/g$ or less, for example 2 $m^2/g$ or greater and 250 $m^2/g$ or less, 5 $m^2/g$ or greater and 1000 $m^2/g$ or less, for example 5 $m^2/g$ or greater and 500 $m^2/g$ or less, for example 5 $m^2/g$ or greater and 250 $m^2/g$ or less, for example 10 $m^2/g$ or greater and 1000 $m^2/g$ or less, for example 10 $m^2/g$ or greater and 500 $m^2/g$ or less, for example 10 $m^2/g$ or greater and 250 $m^2/g$ or less, for example 20 $m^2/g$ or greater and 1000 $m^2/g$ or less, for example 10 $m^2/g$ or greater 500 $m^2/g$ or less, for example 20 $m^2/g$ or greater and 250 $m^2/g$ or less, for example 50 $m^2/g$ or greater and 1000 $m^2/g$ or less, for example 50 $m^2/g$ or greater 500 $m^2/g$ or less, for example 50 $m^2/g$ or greater and 250 $m^2/g$ or less, or any combination of these ranges.

The SSA may be measured for example by nitrogen absorption.

In one embodiment the material has a porosity of 30% or greater, for example 35% or greater, for example 40% or greater, for example 45% or greater, for example 50% or greater, for example 55% or greater, for example 60% or greater, for example 65% or greater, for example 70% or greater, for example 75% or greater, for example 80% or greater. The porosity may be measured according to the average visible film thickness and its mass or optical thickness. The porosity may be measured using the ratio between the apparent density and the bulk density of the constituent material.

The term "porosity" is understood to include open porosity and closed porosity. In one embodiment "porosity" refers to open porosity. In another embodiment "porosity" refers to closed porosity. In a further embodiment, "porosity" refers to open and closed porosity. Porosity may be considered to be the percentage of void volume in a substance.

In one embodiment the material has roughness of 15 nm RMS (average roughness) or above, for example 15 nm to 10 um. For example, the material may have a roughness of 15 nm to 50 nm, e.g. 50 nm to 100 nm, e.g. 100 nm to 200 nm, e.g. 200 to 500 nm, e.g. 500 nm to 1000 nm (1 um), e.g. 1 um to 2 um RMS (average roughness). In another embodiment the nanostructured material has roughness of between about 2 um and 10 um RMS (mean roughness). The roughness may be measured once the material has been attached to the surface, optionally after the support has been removed. The roughness may be measured by white light interferometry or ellipsometry.

The material is nanostructured. The term "nanostructured" in this context refers to materials having structures in which at least one dimension, and optionally two or three dimensions, are on the nano-scale (i.e. about 1 um or less, e.g. about 900 nm or less, e.g. about 800 nm or less, e.g. about 700 nm or less, e.g. about 600 nm or less, e.g. about 500 nm or less, e.g. about 400 nm or less, e.g. about 300 nm or less, e.g. about 200 nm or less, e.g. about 100 nm or less). For example a nanostructured material may have nanoscale thickness (e.g. thickness of less than about 1000 nm or less than about 500, 400, 300, 200 or 100 nm). Examples of nanostructures are nanofibres, nanoprojections, nanopores and nanotubes. For example, the material may comprise (or may consist essentially of, e.g. may consist of) any one or more of nanofibres, nanosheets, nanoparticles, carbon nanotubes, agglomerates, fractals, nano-dots, graphene sheets or three-dimensional nanostructures For example, the material may comprise (or may consist essentially of, e.g. may consist of) nanofibres or nanoparticles, e.g. nanofibres.

The nanofibres may have a diameter of 1 um or less, 600 nm or less, 200 nm or less, suitably 100 nm, or less e.g. 50 nm or less, e.g. 25 nm or less. The nanofibres of the material may have a diameter of 1 nm or greater, suitably 5 nm or greater, e.g. 10 nm or greater. The nanofibres of the material may have a diameter of 200 nm or less and 1 nm or greater, suitably 200 nm or less and 5 nm or greater, e.g. 200 nm or less and 10 nm or greater. The above diameters should be taken to be mean diameters. Further, the nanofibres of the material may have a length which is not on the nano scale, e.g. from about 10 nm to about 200 um or longer, e.g. from about 10 nm to about 150 um, e.g. from about 10 nm to about 100 um, e.g. from about 10 nm to about 50 um, e.g. from about 10 nm to about 10 um, e.g. from about 10 nm to about 5 um, e.g. from about 10 nm to about 1 um.

In one embodiment, the material may comprise nanofibres. The material may be exclusively nanofibrous. Alternatively the material may be such that the material comprises nanofibres which are beaded (beaded nanofibres). Alternatively the material may comprise nanofibres and distinct beads amongst the nanofibres. The beads may be nanobeads or microbeads. The nanofibres may be electrospun. The material comprising nanofibres (and optionally beads) may exhibit the lotus effect. The material comprising nanofibres (and optionally beads) may exhibit the Rose Petal effect.

The nanosheets may have a thickness on the nano scale. The nanosheets may have a thickness of about 1 um or less, or less than about 500, 500, 300, 200, 100, 50, 20 or 10 nm. Other dimensions (width, length) of the nanosheets may be larger than 1 um and may be on a macro-scale (e.g. greater than about 1 mm, or greater than about 2, 3, 4, 5 or 10 mm).

Nanoparticles are particles having a size on the nano scale. The nanoparticles may have a largest dimension of about 1 um or less, e.g. about 800 nm or less, e.g. about 700 nm or less, e.g. about 600 nm or less, e.g. about 500 nm or less, e.g. about 400 nm or less, e.g. about 300 nm or less, e.g. about 200 nm or less.

The material may have hydrophobic properties, e.g. super-hydrophobic properties. It is considered that a high SSA is required for super-hydrophobic properties. The smaller the fibre diameter of fibres making up a layer, the higher the SSA of the layer. The higher the SSA of a hydrophobic layer, the greater its hydrophobicity will be, in general.

The term "hydrophobic" means difficult to wet with water. The water contact angle of a hydrophobic material may exceed 70° (e.g. exceeds 75°, e.g. exceeds 80°, e.g. exceeds 85°, e.g. exceeds 90°, e.g. exceeds 95°, e.g. exceeds 100°, e.g. exceeds 110°, e.g. exceeds 120°, e.g. exceeds 130°, e.g. exceeds 140°, e.g. exceeds 150°, e.g. exceeds 160°), as measured at 20° C. and atmospheric pressure. The terms contact angle and water contact angle are used herein interchangeably. The contact angle may be abbreviated as CA.

The term "super-hydrophobic" means highly hydrophobic, i.e., extremely difficult to wet with water. The water contact angle of the material may exceed 120° (e.g. it may exceed 130°, 135°, 140°, 145°, 150°, 155°, or 160°, or it may be about 150°, 155°, 160° or 165°). The roll-off angle may be less than 20° and may be e.g. 15°, e.g. 10°, e.g. 9°, e.g. 8°, e.g. 7°, e.g. 6°, e.g. 5°. These parameters are as measured at 20° C. and atmospheric pressure but may vary from the above values under different conditions.

The term "contact angle" is the angle, conventionally measured where a liquid/vapour interface meets a solid surface. A given system of solid, liquid, and vapour (water vapour in air) at a given temperature and pressure has a unique equilibrium contact angle. However, in practice contact angle hysteresis is observed, ranging from the so-called advancing (maximal) contact angle to the receding (minimal) contact angle. The equilibrium contact is within those values, and can be calculated from them. The equilibrium contact angle reflects the relative strength of the liquid, solid and vapour molecular interactions. The contact angle can be measured by means of a contact angle goniometer.

As used herein, the term "contact angle" may refer to the equilibrium contact angle or to the advancing contact angle or the receding contact angle or to the mean of the advancing and receding contact angles. The contact angle may be measured when the solid surface is horizontal.

As a solid surface is tilted, gravity causes the contact angle on the downhill side to increase while the contact angle on the uphill side decreases. Respectively, these contact angles are referred to advancing and receding angles. The difference between them is the contact angle hysteresis.

The roll-off angle is the maximum tilt angle that a solid can be tilted before a water droplet on a flat surface of the solid releases i.e. starts to move.

The material may exhibit rose petal properties as disclosed in Australian provisional application entitled "Mesh", filed on 24 Mar. 2015 and having the Australian National University as the Applicant and Vincent Craig, David Russell Nisbet, Antonio Tricoli, and William Wong Sai Yau as Inventors.

The material of the present invention may be a fibrous mesh having a static water contact angle of greater than about 150°. The mesh may have one or both of the following two properties:
  a water droplet of about 10 mg adheres to a horizontal underside of said fibrous mesh without detaching therefrom; and
  transfer of said droplet from said underside to a second surface occurs such that essentially none of the water of said droplet remains adhered to said fibrous mesh.

These properties may be considered to define a "Rose Petal" effect surface.

A process for making the fibrous mesh having a static water contact angle of greater than about 150°, may comprise electrospinning a liquid polymer composition through a nozzle for sufficient time to form said fibrous mesh. The resulting fibrous mesh may have one or both of the following properties:
  a water droplet of at least 10 mg adheres to a horizontal underside of said fibrous mesh without detaching therefrom; and
  transfer of said droplet from said underside to a second surface occurs such that essentially none of the water of said droplet remains adhered to said fibrous mesh.

A process for transferring a liquid droplet from the fibrous mesh to a second surface, may comprise:
  bringing said second surface in contact with said liquid drop; and
  withdrawing the second surface from the fibrous mesh so as to detach said liquid drop from the fibrous mesh;
wherein substantially no liquid from the liquid drop remains on the fibrous mesh following said detaching.

The fibrous mesh may be used in a microfluidic device.

The material may have hydrophilic properties. The water contact angles of such a material may be less than e.g. about 20°, about 10°, or about 5°, and may be about 20°, 15°, 10°, 5°, 4°, 3°, 2° or 1°, and may be about 0°. These parameters are as measured at 20° C. and atmospheric pressure. The humidity under the measurement conditions may be standard humidity (for example 50% relative humidity).

The material may have super-hydrophilic properties. The term "super-hydrophilic" means highly hydrophilic. The water contact angles of such a material may be less than about 5°, e.g. less than about 4°, 3°, 2° or 1°, and may be about 0°. These parameters are measured at 20° C. and atmospheric pressure. A super-hydrophilic material may achieve a contact angle of less than about 10°, optionally less than about 4°, 3°, 2° or 1°, within about 0.5 seconds of contact.

The material may have self-cleaning properties. It may thus provide the surface of a substrate on which it is present with a self-cleaning surface. The term "self-cleaning" means that dirt particles are picked up by water droplets and are thus easily cleaned off the self-cleaning surface. Self-cleaning may be a result of super-hydrophobicity (the "lotus" effect also known as the "lotus leaf" effect).

The nanostructured material may comprise PS. Alternatively or additionally the material may comprise polyethylene terephthalate, nylon, polycarbonate, polyethylene, polydimethylsiloxane (PDMS), PTFE etc or mixtures thereof. Alternatively it may be, or may comprise, silica, titania, zirconia, some other inorganic oxide or some other inorganic material. It may in some embodiments be in particulate, e.g. nanoparticulate, form.

The material may comprise a polyester such as polycaprolactone (PCL), polylactic acid (PLA) or polyglycolide (PGA). Polycaprolactone may be useful for providing a bio-compatible coating on the surface of a substrate.

The material may comprise (or may consist essentially of, e.g. may consist of) protein.

The film may be used to provide a bio-compatible coating on the surface of a substrate.

A nanostructured (e.g. nano-thin) protein, or protein-containing, film may be formed through post functionalization of the nanostructured material following attachment of the nanostructured material to the surface of a substrate by means of the attaching layer. A nanostructured (e g nano-thin) protein film may be formed through post functionalization with protein and/or short epitopes of engineering amino acids, physical adsorption of proteins and/or short epitopes of engineering amino acids to the nanostructured material. Alternatively, the entirely nanostructured film may be formed from proteins and/or short epitopes of engineering amino acids. Any sequence of amino acids may be used. A suitable bio-active or bio-compatible coating could for example consist of fibronectin, laminin, collagen, elastin or any of their subtypes or indeed shorter amino acid sequences from their longer structures. In addition to a nanostructured protein film, a bio-active film may be achieved using a nanostructured glycosaminoglucan film. This may comprise, or may consist of, proteoglycans (i.e. heparan sulfate, chondroptin sulfate, keratan sulfate etc.), or non-proteoglycan polysaccharides (i.e. hyaluronioc acid etc). These may produce bio-active films in much the same way as with proteins.

Polystyrene (PS) as the Material

PS is generally hydrophobic and, if nano-structured, e.g. in the form of nanofibres, it may be super-hydrophobic. When the material of the present invention comprises PS, the material may suitably comprise nanofibres having a diameter of 600 nm or less. The SSA may be 1 $m^2/g$ or greater, e.g. 10 $m^2/g$ or greater. The PS layer may be super-hydrophobic. This may be used to establish a self-cleaning layer. Thus it may remain on eyewear or another surface to which the material is attached (by means of the attaching layer) upon removal of the support (self-sustaining scaffold).

For a transparent coating on the surface of a substrate, the thickness of the PS layer should be 400 nm or less, e.g. 200 nm or less in order to be transparent.

For a super-hydrophobic coating on the surface of a substrate, the PS layer should preferably have sufficiently high SSA to produce sufficient hydrophobicity.

Suitable PS may have a Mw of between 30-500 kDa. It may have a melting point or a softening point above 100° C.

Polycaprolactone (PCL) as the Material

PCL may be used as the material, for example for providing a bio-compatible coating on which cells can be grown or for encapsulation purposes.

PCL may be in the form of nanofibres. When the material of the present invention comprises PCL, the material may suitably comprise nanofibres having a diameter of 600 nm or less.

Suitable PCL may have a Mw of between 40-500 kDa. It may have a melting point or a softening point above 60° C.

Inorganic Material as the Material

Inorganic materials, e.g. metal oxides, may be used as the material e.g. $TiO_2$ or ZnO or $SiO_2$. A further example of an inorganic compound is manganese oxide ($Mn_xO_y$). Mixtures of these may also be used.

The inorganic material (e.g. manganese oxide) may be deposited by flame spray pyrolysis, impregnation or low temperature spray coating or by some other suitable method.

Composite Material as the Material

The material may be a composite material. It may comprise more than one type of nanostructured material. For example, the material may comprise nanofibres and nanoparticles. For example, it may comprise a nanofibrous polymer (such as nanofibrous polycaprolactone) and inorganic nanoparticles (e.g. metal oxides, such as. $TiO_2$ or ZnO or $SiO_2$ or $Mn_xO_y$ or mixtures thereof).

The nanofibrous polymer may be formed onto a support (e.g. polyvinylpyrrolidine and paper) by electrospinning. The inorganic nanoparticles may for example be deposited onto and/or into the nanofibrous polymer by impregnation or low temperature spray coating or by some other suitable method. The inorganic nanoparticles may for example be deposited onto and/or into the nanofibrous polymer by flame spray pyrolysis. Alternatively or additionally nanoparticles may be included with the polymer during electrospinning.

In some instances nanoparticles may provide, or assist in providing, highly hydrophilic or super-hydrophilic properties to the material.

Removable Support (Scaffold)

The term "removable" in the context of the support is understood to mean that the support can be removed in some way from the nanostructured material after attachment of the film to a surface without destruction of the nanostructured material, so as to reveal the material (the material being attached to the surface by means of the attaching layer).

The function of the support (scaffold) is to provide mechanical integrity to the multilayer film. The support may act as a scaffold. It may thus enable the film to be attached onto a substrate without destroying or damaging the material. It may protect the material during the storage, transport and attachment stages. The support may be mechanically stable (robust). The support may be solid.

The support should be coupled to the nanostructured material. It may be adjacent thereto or may interpenetrate the material. The support may be disposed on and/or in the material. In one embodiment, the support and the material are both fibrous and at least partially interpenetrate one another.

After the film has been attached to a substrate, the support may be removed, for example by dissolving the support in a solvent (e.g. water). Alternatively, it may be treated with a reagent which removes it from the surface without damaging the material. Further, photodegradation could be used to remove the support when the support is a photodegradative material.

The thickness of the support is not critical because the layer is sacrificial and is intended to be removed (e.g. by dissolving the layer using a solvent) after the film is attached to the surface of a substrate. The thickness of the support may be, for example, from about 200 nm to about 5 mm (e.g. from about 200 nm to about 2 mm, from about 200 nm to about 1 mm, from about 200 nm to about 500 um, from about 200 nm to about 100 um, from about 200 nm to about 10 um). It should be sufficiently thick as to provide mechanical integrity. This thickness will depend in part on the nature of the support. The required thickness will of course depend on the nature of the substance from which the support is made. It may be sufficiently thin to enable the film to conform to a substrate. It may also be sufficiently thin as to permit its rapid removal (e.g. by dissolution). It should be sufficiently thick so as to provide the requisite level of support to the material.

The melting point or softening point of the support may be higher than the respective melting point or softening point of the attaching layer, e.g. about 10° C. or higher, such as about 10° C., about 20° C., about 30° C., about 40° C. or about 50° C. or more (e.g. up to about 100° C.) higher than the melting point of the attaching layer. This allows the attaching layer to attach to a substrate without melting the support.

The softening point of the support may be higher than the softening point of the attaching layer, e.g. about 10° C. or higher, such as about 10° C., about 20° C., about 30° C., about 40° C. or about 50° C. or more (e.g. up to 100° C.) higher than the softening point of the attaching layer.

The support may be soluble in a solvent which does not dissolve the material. This enables that the support to be removed from the material after attachment of the film to a surface, so as to reveal the material (the material being attached to the surface by means of the attaching layer). The solvent may be such that it does not dissolve the attaching layer. In this context, "does not dissolve" refers specifically to the conditions under which dissolution of the support is conducted. Thus, for example it may be possible to use a solvent which dissolves the support but not the material or the attaching layer at a particular temperature but which might dissolve the material or the attaching layer at some higher temperature.

The support may alternatively be removed by radiation, e.g. UV radiation, e.g. X-ray radiation, e.g. gamma radiation.

The support may comprise PVA. The support may comprise PVP. Alternatively the support may be any component which can be removed without damaging the other two layers and which is capable of providing the requisite degree of support to the material. Alternatively the support may be any non-photoresist material that could be easily etched away. It may even be Si. The support may be nanostructured in order to facilitate its rapid removal.

Removal of the support may be achieved by use of a solvent that does not dissolve the other layers (e.g. an aqueous solvent, e.g. water) or irradiation (e.g. UV). Alternatively the support may be removed by mechanical process, e.g. peeling, abrading or laser ablation. In the event that the support has more than one layer, each layer may be removable by different processes or they may be removable by the same process. For example one layer may be removable by peeling and another layer may be removable by dissolution.

The support may comprise a surfactant e.g. dodecyltrimethylammonium bromide (DTAB). The role of surfactant is to improve the electrospinnability of the precursor solution increasing the concentration of charge carriers. This improves the resulting morphology usually leading to more and smaller fibers.

Polyvinyl Alcohol (PVA) as the Removable Support (Scaffold)

Due to the water solubility of PVA, this may conveniently be used as the support (sacrificial, self-sustaining scaffold). It may protect and/or enable the attachment of the material.

The present invention may utilize PVA as the support (scaffold, sacrificial component), as it can be electrospun as a base layer. The layer may be fibrous. It may be nanofibrous. The fibre thickness and orientation are not of primary importance because once the film is attached to the given surface, this support may be removed e.g. by placing water onto the surface until the PVA fibres dissolve. The thickness of the PVA fibres may affect the rate of dissolution.

The PVA layer may prevent any damage that might otherwise occur to the material during the attachment of the film to the surface or during storage or transport. Once the film is attached to the surface, due to its ability to be dissolved in water, this support is then removable to reveal the material. It will be understood that the water solubility of PVA depends on factors such as the degree of polymerization (DP) and degree of hydrolysis (DH). Thus it is preferred that a grade of PVA is used which is water soluble. The DP may be from about 20 to about 2000 or about 20 to about 1000, about 20 to about 1000, about 20 to about 500, about 20 to about 100, about 20 to about 50, about 50 to about 2000, about 100 to about 2000, about 500 to about 2000, about 1000 to about 2000, about 100 to about 1000 or about 500 to about 1000, e.g. about 200, about 300, about 400, about 500, about 600, about 700, about 800, about 900, about 1000, about 1200, about 1500 or about 2000. The degree of hydrolysis may be greater than about 40 and may be greater than about 50, about 60, about 70, about 80, about 90 or about 95%, or may be about 40 to about 80%, or about 40 to about 69%, about 60 to about 80%, or about 80 to about 95%, e.g. about 40, about 50, about 60, about 70, about 80, about 90, about 95, about 99 or about 100%.

The rate of dissolution may depend on the fibre thickness. The rate of dissolution may also depend on the film thickness. Thus thinner films and/or thinner fibres are preferred.

Polyvinyl Pyrrolidine (PVP) as the Removable Support (Scaffold)

Due to the water solubility of PVP, this may conveniently be used as the support (sacrificial, self-sustaining scaffold). It may protect and/or enable the attachment of the material.

The present invention may utilize PVP as the support (scaffold, sacrificial component), as it can be electrospun as a base layer. The layer may be fibrous. It may be nanofibrous. The fibre thickness and orientation are not of primary importance because once the film is attached to the given surface, this support may be removed e.g. by placing water onto the surface until the PVP fibres dissolve. The thickness of the PVP fibres may affect the rate of dissolution.

The PVP layer may prevent any damage that might otherwise occur to the material during the attachment of the film to the surface or during storage or transport. Once the film is attached to the surface, due to its ability to be dissolved in water, this support is then removable to reveal the material. The DP may be from about 20 to about 2000 or about 20 to about 1000, about 20 to about 1000, about 20 to about 500, about 20 to about 100, about 20 to about 50, about 50 to about 2000, about 100 to about 2000, about 500 to about 2000, about 1000 to about 2000, about 100 to about 1000 or about 500 to about 1000, e.g. about 200, about 300, about 400, about 500, about 600, about 700, about 800, about 900, about 1000, about 1200, about 1500 or about 2000.

The rate of dissolution may depend on the fibre thickness. The rate of dissolution may also depend on the film thickness. Thus thinner films and/or thinner fibres are preferred.

The PVP support may comprise a surfactant e.g. dodecyltrimethylammonium bromide (DTAB).

Attaching Layer

The function of the attaching layer is to attach the material to the surface of a substrate.

The attaching layer may be disposed on either (i) a layer of nanostructured material such that the layer of material is disposed between the attaching layer and the support or (ii) a layer comprising the nanostructured material and the support together. Attachment of the material to the surface of the substrate may be effected by a method comprising placing (i) or (ii) onto the surface of a substrate such that the attaching layer abuts the surface.

Alternatively the attaching layer may be disposed on the surface of a substrate. Attachment of the material to the surface of the substrate may in this case be effected by a method comprising placing onto the attaching layer either (i) a layer of material which is disposed on one side of the support or (ii) a layer comprising the material and the support together; such that the attaching layer abuts (i) or (ii).

The causing of the attaching may comprise applying heat (so that the attaching layer softens and/or melts) and/or radiation (e.g. visible light, UV or X-ray) and/or a chemical agent either directly or indirectly to the attaching layer so as to attach the material to the surface. The causing of the attaching may comprise applying pressure. The causing of the attaching may not require application of heat or pressure.

The softening point or melting point of the attaching layer may be lower than that of the nanostructured material. This will allow for the attaching layer to be softened and/or melted and subsequently attach to the substrate without destroying or damaging the material. The film may be attached to the surface by heating the attaching layer so that it softens and/or melts and attaches the film to the surface. The softening or melting point of the attaching layer may be 80° C. or greater, for example 90° C. or greater.

The attaching layer may be bonded (i.e. caused to attach) to the substrate and the layer of material independently through chemical reaction or irradiation e.g. UV, gamma, X-ray.

The attaching layer may attach to the surface chemically, physiochemically or physically. This may be by formation of chemical bonds (e.g. chemisorption) and/or physical interlocking. The attachment can be triggered by heat, light and/or specific chemical/environmental conditions.

In this context, the softening above the softening point should be sufficient to provide adhesion, e.g. by a "keying in" mechanism, to a substrate.

The attaching layer may be insoluble in the solvent used to remove the support.

The thickness of the attaching layer may be 10 nm or greater (e.g. 100 nm or greater (e.g. 200 nm or greater, e.g. 500 nm or greater, e.g. 1 um or greater). The thickness may be 1 millimeter (mm) or less (e.g. 500 um or less, 100 um or less, 50 um or less, 10 um or less, 1 um or less).

The attaching layer may be transparent. This enables the coating applied onto the surface to also be transparent. The thickness of the attaching layer and the material may be 400 nm or less in total.

The attaching layer may be a thermoplastic polymer such as a polyolefin e.g. PP, LDPE, LLDPE. The attaching layer may be a halogenated polyolefin such as a polyvinyl halide e.g. polyvinylchloride (PVC), polyvinylidene difluoride (PVDF), polyvinylidene dichloride (PVDC), copolymers thereof etc. Alternatively the attaching layer may comprise (e.g. may consist essentially of, e.g. may consist of) inorganic particles, e.g. metal particles such as copper nanoparticles. Alternatively the attaching layer may comprise (e.g. may consist essentially of, e.g. may consist of) a photoresist such as a phenol formaldehyde resin.

The attaching layer may comprise a binder (e.g. polydimethylsiloxane (PDMS)).

Polyolefin (e.g. Polypropylene (PP)) as the Attaching Layer

In one embodiment, the attaching layer of the film comprises a polyolefin. PP is a suitable substance for the attaching layer but it can also be made by another suitable polymer or blend of polymers. It is important to ensure that the material (having e.g. super-hydrophobic properties) can be attached onto any surface to which the film is applied.

The PP layer needs to be thick enough, yet still on the nano-scale, to allow for the attaching property of the polymer to work. PP is a rubber at room temperature i.e. it is above its glass transition temperature at room temperature. Due to the rubbery nature of this layer, it may be formed last, and deposited onto an already assembled material and support. When placed onto the given surface the attaching PP layer may only need to be slightly heated to enable the material to attach to the surface. It may be heated to about 50° C., e.g. about 60° C., e.g. about 70° C., e.g. about 80° C., e.g. about 90° C., e.g. about 100° C., e.g. about 110° C., e.g. about 120° C., e.g. about 130° C., e.g. about 140° C., e.g. about 150° C., e.g. about 160° C., e.g. about 170° C., e.g. about 180° C. It may be applied to the surface of a substrate at or above these temperatures. The PP may be fibrous. It may be electrospun. This may facilitate its rapid softening so as to speed up the attachment step.

Room temperature in the context of the present specification should be understood to mean between about 18° C. and 25° C., suitably about 20° C. (but may be for example 18° C., 19° C., 20° C., 21° C., 22° C., 23° C., 24° C. or 25° C.).

Polyvinyl Chloride (PVC) as the Attaching Layer

In one embodiment, the attaching layer of the film comprises a halogenated polyolefin. Suitable examples include polyvinyl chloride (PVC), polyvinyl fluoride (PVF), polyinylidine difluoride (PVDF) and polyvinylidene dichloride (PVDC) and copolymers thereof.

In one embodiment, the attaching layer of the film comprises PVC. It is important to ensure that the material (having e.g. super-hydrophobic properties) can be attached onto any surface to which the film is applied.

The PVC layer needs to be thick enough, yet still on the nano-scale, to allow for the attaching property of the polymer to work. PVC has a glass transition temperature of around 80° C. It may be formed last, and deposited onto an already assembled material and support. When placed onto the given surface the attaching PVC layer may be heated to a relatively low temperature such as about 50° C., e.g. about 60° C., e.g. about 70° C., e.g. about 80° C., e.g. about 90° C., e.g. about 100° C., e.g. about 110° C., e.g. about 120° C., e.g. about 130° C., e.g. about 140° C., e.g. about 150° C. It may be applied to the surface of a substrate at or above these temperatures. The PVC may be fibrous. It may be electrospun. This may facilitate its rapid softening so as to speed up the attachment step.

The PVC attaching layer may comprise a surfactant such as dodecyltrimethylammonium bromide (DTAB). The role of surfactant is to improve the electrospinnability of the precursor solution increasing the concentration of charge carriers. This improve the resulting morphology usually leading to more and smaller fibers.

Specific Embodiments of the Film

In one embodiment, three polymer layers are constructed:
(a) a support: comprising polyvinyl alcohol (PVA)—due to the solubility of PVA fibres, this is being used as a sacrificial layer and to protect the polystyrene (PS) layer during the storage, transport and attachment stages.
(b) a high SSA layer of material comprising polystyrene (PS)—PS experiences hydrophobic properties and, on a nano scale, super-hydrophobic properties. Suitably the layer of material comprises PS nanofibres having a diameter of 200 nm or less. This may intensify the super-hydrophobic property. It may establish a self-cleaning layer for example for use on eyewear or other surface onto which the layer of material is attached. Thus the high SSA may remain on eyewear or another surface to which the material is attached (by means of the attaching layer) upon removal of the support layer (self-sustaining scaffold).
(c) an attaching layer comprising polypropylene (PP)—the attaching layer is important to ensure that the high SSA layer can be attached to a glass substrate or any surface to which the film is applied.

Figure 2:
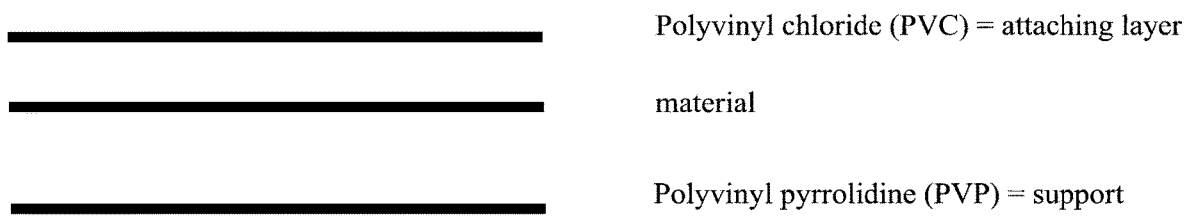
FIG. 2 is a diagram illustrating another example of an assembly of a flexible nanostructured film according to the present invention.

The assembly of an embodiment of the attachable nanostructured coating can be seen in FIG. 1. The assembly of another embodiment of the attachable nanostructured coating can be seen in FIG. 2.

Each of the polymers may have a different melting point. When the three layers are PP as the attaching layer, PS as the material (e.g. having super-hydrophobic properties) and PVA as the support, the PP layer may be heated to 130° C., as this is the softening point for suitable grades of PP. Both PVA and PS may have melting points in excess of 200° C. This is beneficial, as it will allow for the PP layer to be softened and/or melted without destroying the core PS layer.

In another embodiment, three polymer layers are constructed:
(a) a support: comprising polyvinyl pyrrolidine (PVP)—due to the solubility of PVP fibres, this is being used as a sacrificial layer and to protect the polystyrene (PS) layer during the storage, transport and attachment stages.
(b) a high SSA layer of material comprising polystyrene (PS)—PS experiences hydrophobic properties and, on a nano scale, super-hydrophobic properties. Suitably the layer of material comprises PS nanofibres having a diameter of 200 nm or less. This may intensify the super-hydrophobic property. It may establish a self-cleaning layer for example for use on eyewear or other surface onto which the layer of material is attached. Thus the high SSA may remain on eyewear or another surface to which the material is attached (by means of the attaching layer) upon removal of the support layer (self-sustaining scaffold).
(c) an attaching layer comprising polyvinyl chloride (PVC)—the attaching layer is important to ensure that the high SSA layer can be attached to a glass substrate or any surface to which the film is applied.

Each of the polymers may have a different melting point. When the three layers are PVC as the attaching layer, PS as the material (e.g. having super-hydrophobic properties) and PVP as the support, the PVC layer may be heated to about 200° C., as this is the softening point for suitable grades of PVC. Both PS and PVC may have a softening or melting point of about 200° C. This is beneficial, as it will allow for the PVC layer to be softened and/or melted without destroying the core PS layer.

These nanostructured layers can be synthesized by a variety of methods such as electrospinning, nanoparticle aerosol deposition, monolayer self-assembly, layer-by-layer synthesis, sputtering, sol-gel, wet-synthesis and spray pyrolysis. Electrospinning is often used. Use of electrospinning can be advantageous because of the resultant low cost of manufacturing.

Methods for Making the Film

The method may comprise providing a support, forming a material on and/or in the support and depositing an attaching layer onto the material.

Providing the support may comprise providing a reinforcement layer onto a backing layer. For example, a reinforcement layer (e.g. PVP) may be electrospun onto a backing layer (e.g. a cellulose-based sheet such as paper e.g. absorbent paper towel). The backing layer is removable. The backing layer may be removed simultaneously with the reinforcement layer. Alternatively the backing layer may be removed before removal of the reinforcement. The backing layer may be removed by mechanical means. The reinforcement layer may protect the material from damage during removal of the backing layer.

The method may alternatively comprise forming together a material and a support (e.g. by coextrusion, coaxial electrospinning or using multiple nozzles simultaneously) and then depositing onto that an attaching layer.

The term "onto" is understood not to be limited to "directly onto". For example, in the context of the method of making the film, when it is stated that the material is formed "onto" the support, the presence of an intermediate layer between the material and the support is not excluded. In common embodiments, no intermediate layers are present, in which case "onto" may be read as "directly onto". In the context wherein the support is not a separate layer, "onto" is understood to comprise "in"

The term "forming" includes electrospinning, nanoparticle aerosol deposition, monolayer self-assembly, layer-by-layer synthesis, sputtering, sol-gel, wet-synthesis and spray pyrolysis.

The term "depositing" includes electrospinning, nanoparticle aerosol deposition, monolayer self-assembly, layer-by-layer synthesis, sputtering, sol-gel, wet-synthesis and spray pyrolysis.

When the material comprises a polymer, the material can be synthesized by a variety of methods such as electrospinning, nanoparticle aerosol deposition, monolayer self-assembly, layer-by-layer synthesis, sputtering, sol-gel, wet-synthesis and spray pyrolysis. Flame spray pyrolysis may be used to generate an aerosol for aerosol deposition. Electrospinning is often used for synthesis of the nanostructured material when the material comprises a polymer.

The step of forming one or more (e.g. one, e.g. two, e.g. three) of the nanostructured material, the support and the attaching layer may comprise a step selected from the group consisting of: electrospinning, nanoparticle aerosol deposition, monolayer self-assembly, layer-by-layer synthesis, sputtering, sol-gel, wet-synthesis and spray pyrolysis, e.g. electrospinning or spray pyrolysis. Flame spray pyrolysis may be used to generate an aerosol for aerosol deposition. Flame-made nanoparticle aerosol can be deposited on the support layer by diffusion, thermophoresis and electrophoresis. Impregnation or spray coating (e.g. low temperature spray coating) may be used. In particular, the forming of one or more (e.g. one, e.g. two, e.g. three) of the material, the support and the attaching layer may comprise electrospinning. For example, the forming of each of the material, the support and the attaching layer may comprise electrospinning.

The precursor for flame spray pyrolysis may be, for example, manganese-based or zinc-based. An example of a manganese-based precursor is manganese acetylacetonate in acetonitrile. An example of a zinc-based precursor is zinc naphthenate (Zn(Nph)) in xylene. Other examples include organometallic materials such as tin (II) ethylhexanoate diluted in xylene for synthesis of SnO and titanium tetra isopropoxide diluted in xylene or toluene (etc) for $TiO_2$.

Electrospinning uses an electrical charge to draw very fine (e.g. on the nano scale) fibres from a liquid. When a sufficiently high voltage is applied to a liquid droplet, the body of the liquid becomes charged, and electrostatic repulsion counteracts the surface tension and the droplet is stretched; at a critical point a stream of liquid erupts from the surface. This point of eruption is known as the Taylor cone. If the molecular cohesion of the liquid is sufficiently high, stream breakup does not occur and a charged liquid jet is formed. (If stream breakup does occur, droplets are electrosprayed).

As the jet dries in flight, the mode of current flow changes from ohmic to convective as the charge migrates to the surface of the fibre. The jet is then elongated by a whipping process caused by electrostatic repulsion initiated at small bends in the fibre, until it is finally deposited on a grounded (earthed) collector. The elongation and thinning of the fibre resulting from this bending instability may lead to the formation of uniform fibres with nano-scale diameters.

Electrospinning may produce fibres from a solution or from a molten starting material. In the present instance, the electrospinning may produce fibres from a solution.

The step of forming the material may comprise a step selected from the group consisting of: electrospinning, nanoparticle aerosol deposition, monolayer self-assembly, layer-by-layer synthesis, sputtering, sol-gel, wet-synthesis and spray pyrolysis, e.g. electrospinning or spray pyrolysis. In particular, the forming of the material may comprise electrospinning.

Forming the material by electrospinning may afford a material with a high SSA. The layer may be nanostructured. The material formed by electrospinning may have super-hydrophobic properties. It may have self-cleaning properties.

The step of forming the support may comprise a step selected from the group consisting of: electrospinning, nanoparticle aerosol deposition, monolayer self-assembly, layer-by-layer synthesis, sputtering, sol-gel, wet-synthesis and spray pyrolysis, e.g. electrospinning or spray pyrolysis. In particular, the forming of the support may comprise electrospinning.

Electrospinning is often used to form the support because it provides a support with a suitable combination of flexibility and strength. Forming the support by electrospinning may afford a support with a high SSA. The layer may be nanostructured. A support with a high SSA may be removed by dissolution more rapidly than a support with a lower specific surface area.

The step of depositing the attaching layer may comprise a step selected from the group consisting of: electrospinning, nanoparticle aerosol deposition, monolayer self-assembly, layer-by-layer synthesis, sputtering, sol-gel, wet-synthesis and spray pyrolysis, e.g. electrospinning or spray pyrolysis. In particular, the depositing (forming) of the attaching layer may comprise electrospinning.

Depositing (forming) the attaching layer by electrospinning may afford an attaching layer with a high SSA. The layer may be nanostructured. The attaching layer deposited by electrospinning and hence having a high SSA may have a higher melting rate or higher softening rate than an attaching layer with a lower specific surface area.

The electrospinning (e.g. of the material) may be carried out under conditions so as to produce nanofibres having a diameter of about 350 nm or less, e.g. about 200 nm or less, e.g. about 100 nm or less, e.g. 50 nm or less, e.g. 25 nm or less. The extrusion rate, concentration rate and voltage may be such as to produce nanofibres, preferably of diameter about 350 nm or less, e.g. about 200 nm or less, e.g. about 100 nm or less, e.g. 50 nm or less, e.g. 25 nm or less, or may be such as to produce super-hydrophobic nanofibres, e.g. having a water contact angle of 130° or greater, e.g. 140° or greater or e.g. 150° or greater.

For the material, the electrospinning may be from a solution of PS. The solvent may for example be THF. Alternatively the solvent may be DMF. The solution may be about 10 wt % PS or less, or about 9, 8, 7, 6 or 5 wt % or less. Alternatively the solution may be about 15 wt % PS or less, or about 14, 13, 12, 11 or 10 wt % or less.

The rate of extrusion (flow rate) used for the electrospinning may be about 0.1 to 5 ml/h or about 1 to 5 ml/h, e.g. about 1 ml/h, about 2 ml/h, about 3 ml/h, about 4 ml/h or about 5 ml/h. The suitable rate of extrusion for the electrospinning depends on the needle size and the desired fibre diameter.

The potential used for the electrospinning may be greater than about 10 kV or may be greater than about 20 kV or may about 10 to 50 kV, e.g. about 10 kV, about 20 kV, e.g. about 30 kV, e.g. about 40 kV or e.g. about 50 kV.

In the electrospinning, the distance between the syringe and collector may be from about 5 cm to about 40 cm or may be about 10 cm to about 40 cm or may be about 20 cm to about 30 cm, or about 30 cm to about 40 cm, e.g. about 5, about 10, about 15, about 20, about 25, about 30, about 35 or about 40 cm.

The electrospinning may be carried out at room temperature or at some other temperature, for example about 0° C., about 10° C., room temperature, about 30° C., about 40° C., about 50° C. or about 60° C.

Exemplary nozzle sizes include 18 gauge, 19 gauge, 20 gauge, 21 gauge, 22 gauge, or, 23 gauge.

Electrospinning may employ one or more surfactants. The surfactant may be an ionic surfactant or it may be a non-ionic surfactant. It may be a cationic surfactant or it may be an anionic surfactant or it may be a zwitterionic surfactant. It may be a tertiary ammonium, e.g. tetraalkylammonium, surfactant. It may be a polyethylene glycol based surfactant, for example an alkylphenoxy polyethylene glycol such as Triton X (4-(1,1,3,3-tetramethylbutyl)phenyl-polyethylene glycol) or an alkoxy polyethylene glycol such as Softanol (nonionic surfactant obtained by adding ethylene oxide (EO) to linear secondary alcohols having alkyl carbon atoms ranging between 12 and 14). For example, electrospinning of PS may employ dodecyltrimethylammonium bromide (DTAB) as a surfactant.

A suitable concentration range of the surfactant may be from about 0.0001 wt % to about 1 wt %, for example about 0.001 to 1, 0.1 to 1, 0.0001 to 0.1, 0.0001 to 0.01 or 0.001 to 0.1 wt %, e.g. about 0.0001, 0.0005, 0.001, 0.002, 0.005, 0.01, 0.02, 0.05, 0.1, 0.2, 0.5 or 1 wt % (based on the total weight of the solution).

The surfactant may affect the diameter of the electrospun fibres, for example by facilitating electrospinning of fibres with a smaller diameter than fibres spun under the same conditions except for the absence of the surfactant.

An ionic compound such as NaCl may alternatively or additionally be used to modify the fibre diameter.

The conditions (e.g. rate, concentration, voltage, temperature etc) may be adjusted to as to achieve desired properties.

Methods for Attaching the Material to the Surface

The material of the film of the invention may be attached to a surface according to a method comprising applying the film onto the surface, so that the attaching layer abuts said surface, and causing the attaching layer to attach to said surface. The support may then be removed.

The attaching layer may be disposed on either (i) a layer of material which is disposed between the attaching layer and the support or (ii) a layer comprising the material and the support together. Attachment of the material to the surface of the substrate may be effected by a method comprising placing (i) or (ii) onto the surface of a substrate such that the attaching layer abuts the surface.

Alternatively the attaching layer may be disposed on the surface of a substrate. Attachment of the material to the surface of the substrate may be effected by a method comprising placing together onto the attaching layer either (i) a layer of material which is disposed between the attaching layer and the support or (ii) a layer comprising the material and the support together; such that the attaching layer abuts (i) or (ii).

The term "applying" means bringing into contact with. It encompasses bringing into direct physical contact with and bringing into indirect physical contact with.

The term "abuts" means "is in direct physical contact with".

In order to cause the attaching layer to attach the material to the surface, heat may be applied to the attaching layer either directly or indirectly. For example, the attaching layer itself may be heated or the whole film may be heated (e.g. in an oven, e.g. by a hot air jet, e.g. by UV radiation). An alternative approach would be to apply the attaching layer to a heated surface of a substrate.

Other methods to induce attaching of the attaching layer are also contemplated. For example, irradiation or chemical reaction.

When the attaching layer is caused to attach the film to a surface, the attaching layer may undergo a physical and/or physiochemical and/or chemical change in order to effect the attachment. For example, a physical change may involve softening a polymer and rearrangement of the polymer chains. A chemical change, for example, may involve crosslinking or reaction of a resin with a curing agent or the substrate. A reference to the attaching layer before attachment is understood to refer to the same layer as a reference to the attaching layer after the attachment even if the attaching layer has undergone a physical or chemical change.

In an embodiment wherein the three layers comprise PP, PVA and PS, for example, each of the polymers has a different melting point. When the three layers are PP as the attaching layer, PS as the material (e.g. having super-hydrophobic properties) and PVA as the support, in order for this invention to work, the PP layer may be heated to 130° C., as this is the softening point for many grades of PP. Both PVA and PS have melting points in excess of 200° C. This is beneficial, as it will allow for the PP layer to be completely melted without destroying the core PS layer.

The term "removed" includes partial and complete removal. "Removing" includes removal by dissolution using a solvent (e.g. an aqueous solvent). Removing by other means (e.g. irradiation or stripping) is also contemplated.

The inventors investigated a method of attaching the material of the film to the surface of a substrate by use of a binder, e.g. in the form of a binder layer. An example of a suitable binder is polydimethylsiloxane (PDMS). Use of a binder may improve the adhesion of the film to the substrate. For example, a binder layer may be deposited onto surface of the substrate to afford a modified surface (i.e. a surface having a binder applied thereon). The material of the film of the invention may then be attached to the modified surface according to a method comprising applying the film onto the modified surface, so that the attaching layer of the film abuts said modified surface, and causing the attaching layer to attach to said modified surface. The support may then be removed. In this embodiment of the invention, the binder on the surface of the substrate may be regarded as a part of the surface of the substrate.

The binder may be deposited onto the surface by any method selected from the group consisting of electrospinning, nanoparticle aerosol deposition, monolayer self-assembly, layer-by-layer synthesis, sputtering, sol-gel, wet-synthesis and spray pyrolysis. For example, the binder may be deposited onto the surface by electrospinning.

Uses

The approach proposed by the present invention overcomes limitations of the known methods for assembling coatings through the assembly of a film comprising a material (such as a layer having a high SSA) separately from the substrate. In this way, the mechanical and chemical properties of the coating can be optimised independently from the final properties of the substrate. This allows the material to be placed on a support to create coatings with specific properties (e.g. super-hydrophobicity). Each layer of the film may be created from a different material because different materials can have different properties. For example, different polymers can have different properties so each layer of the film may be created from a different polymer.

This invention describes as an example creation of a high SSA coating (e.g. having super-hydrophobic properties) by providing a layer of nanofibres. A support and an attaching layer may be required. The support is important for the ability to attach the film without destroying the high SSA layer. This support is also a sacrificial layer, which can be removed once the material is attached to the specific surface, as it is no longer required on the given surface. The other layer that is required is an attaching layer that allows the material to attach to the surface.

The present invention provides nanostructured coatings with a high (e.g. 10 $m^2/g$ or greater) specific surface area (SSA) on any kind of substrate material (for example glass, metal, ceramic, plastic or for example a cellulose-based substrate such as paper e.g. absorbent paper towel) and morphology (for example porous, flat, convex, concave). An important concept is to synthesize a self-sustaining and attachable nanostructured coating that can be flexible and attach it to the final substrate surface in a consecutive or parallel step. This is a major innovation with respect to current state-of-the-art nanostructured coating synthesis methods that are largely assembled on a substrate and thus are not self-sustaining or self-supporting. This novel concept also enables optimisation of the synthesis conditions and minimization of the time required for obtaining a nanostructured surface with high SSA on the surface of a substrate. This also permits functionalization of the surface of rigid, flexible, flat, convex, concave, smooth and rough surfaces independently of their fragility. Another advantage is that this approach significantly reduces the costs and time required for such functionalization of a surface with the coating properties as it does not require large infrastructure such as furnaces and chemical/physical vapour deposition facilities that were used in the prior art processes. Thus any one or more, optionally all, of the support, the nanostructured material and the attaching layer may be flexible.

The applications of the invention are very widespread, ranging from nanostructured coatings for fuel cells, conductive electrodes (e.g. transparent conductive electrodes), dye sensitized solar cells and diffuse reflective mirrors, to bio-compatible coatings to promote cell growth and coatings for controlled wetting properties (especially transparent coatings for controlled wetting properties) such as anti-fogging coatings. Potential applications also include microfluidic devices.

With respect to controlled wetting properties, this technology has the ability to attach a super-hydrophobic (self-cleaning) layer to a surface. The super-hydrophobic layer can be attached onto eyewear, windows, car windscreens and the surface of any substrate that requires the self-cleaning property. This has great potential due to its ability to be moved and placed onto a variety of surfaces from plastic to glass and due to the ability to attach the film onto different surfaces.

With respect to bio-compatible coatings to promote cell growth (e.g. when the material is polycaprolactone), this technology has the ability to attach a bio-compatible layer to a surface. The bio-compatible coating can be attached onto medical devices and implants, for example.

With respect to microfluidic devices, it is noted that the ability to control droplet motion without leaving residue on microfluidic devices is important in many wetting applications. This is currently achieved using various techniques, one of which involves electro-wetting through the use of CNT electrodes. Recently, the rose petal effect has also been used in microfluidic devices through a technique of ink-jet printing on super-hydrophobic lotus surfaces in order to induce droplet pinning. The ability to control and move a droplet through mechanical, electrical or other means remains a challenge which would further improve and push the boundaries of microfluidics. The present invention provides a direct and scalable alternative to conventional microfluidic devices with a particular emphasis on droplet motion and control.

EXAMPLES

1. Example of an Assembly of a Flexible Nanostructured Film with a Material Layer Comprised of Polystyrene The assembly and exemplary compositions of the layer are given below see, for example, FIG. 1.

Figure 3:
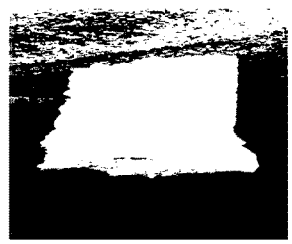
FIG. 3 shows a micrograph of polystyrene (PS) fibres electrospun from 35 wt % PS in THF (tetrahydrofuran) using a flow rate of 4.2 mL/h at a voltage difference of between 5-35 kV.

The first formulation that was used to produce the polystyrene fibres for the material was that from Casper et al ("Controlling Surface Morphology of Electrospun Polystyrene Fibers: Effect of Humidity and Molecular Weight in the Electrospinning Process", Macromolecules, 2004, p 573-578). Casper et al utilized a 35 wt % of polystyrene with a THF solvent. This was initially done to observe if the polystyrene fibres would indeed possess hydrophobic properties. The initial conditions of 4.2 ml/h flow rate and a potential of 10 kV were used in the present work to electrospin the fibres. FIG. 3 displays images of the fibres.

Figure 4:
FIG. 4 shows a micrograph of PS fibres with a scale of 50 um electrospun from 35 wt % PS in THF using a flow rate of 4.2 mL/h at a voltage difference of between 5-35 kV.

A scanning electron microscope (SEM) was taken of the fibres of FIG. 3 and this can be seen in FIG. 4. It is apparent that due to the high flow rate, the fibres are large and not on the scale that was preferred. It can be seen that the fibres are averaging close to 25 um, while the preferred diameter is less than 200 nm.

Figure 5:
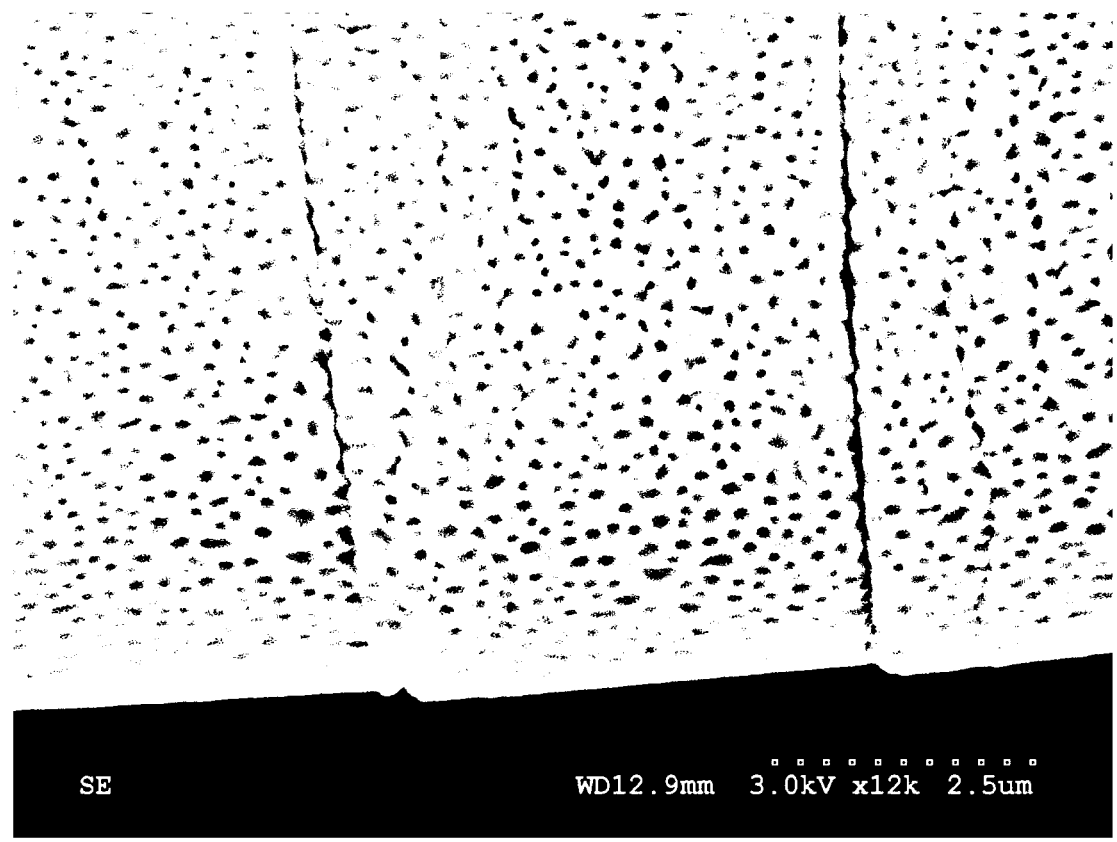
FIG. 5 shows a micrograph of PS fibres with a scale of 2.5 um electrospun from 35 wt % PS in THF using a flow rate of 4.2 mL/h at a voltage difference of between 5-35 kV. Cracks are apparent on the surface of the fibres.

Other issues seem to be present when the surface of the fibres is further enhanced to show the surface morphology in FIG. 5. The hypothesis for this is due to the strain experienced by the size of the fibres due to the high flow rate of the solution during the electrospinning process. Another hypothesis is due to the percentage of polystyrene dissolved in THF. The surface morphology still shows the porous state, which was the preferred result; however it is clear that what appear to be surface cracks on the fibres are not preferred.

Figure 6:
FIG. 6 shows a micrograph of PS fibres with a scale of 500 um electrospun from 35 wt % PS in THF using a flow rate of 1 ml/h at a voltage difference of between 5-35 kV.

Altering the flow rate of the polystyrene solution removed the issue previously discussed. The fibre diameter was decreased significantly, which is evident in FIG. 6 when compared to FIG. 4. However, these fibres were still larger than desired.

Figure 7:
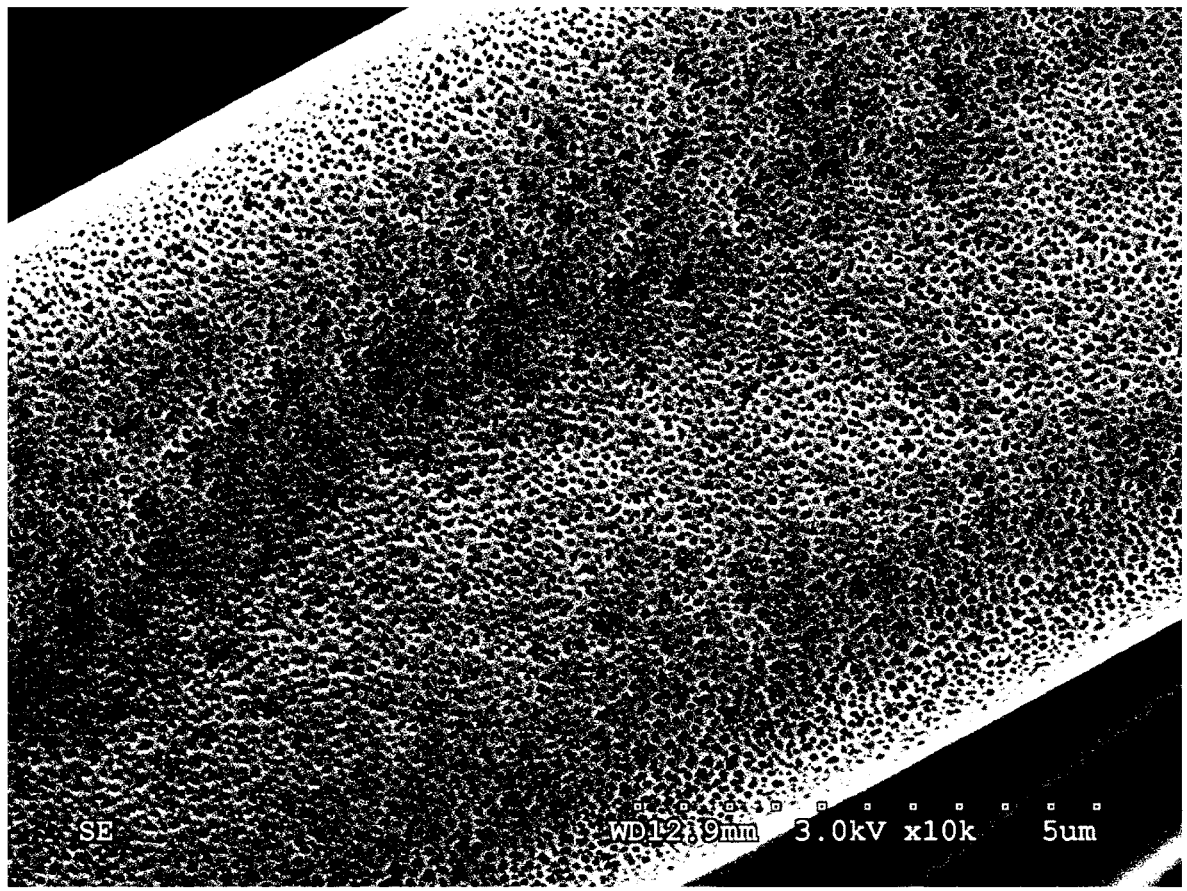
FIG. 7 shows a micrograph of PS fibres with a scale of 5 um electrospun from 35 wt % PS in THF using a flow rate of 1 ml/h at a voltage difference of between 5-35 kV.

A closer image of the individual fibres can be seen in FIG. 7 and it is clear that the surface morphology is consistent with the porous surface that was described by Casper et al (referenced above). The presence of these pores increases the hydrophobicity of the surface and this was evident when a wetting test was performed on the nanofibre surface by dropping a 10 ul droplet on its surface and measuring its high contact angle obtained by these relatively large fibres using a contact angle goniometer.

Figure 8:
FIG. 8 shows a micrograph of PS fibres with a scale of 5 um electrospun from 10 wt % PS in THF using a flow rate of 1 ml/h at a voltage difference of between 5-35 kV. Approximately 1 mg of Dodecyltrimethylammonium bromide (DTAB) per 10 mL of solution was used.

Further work was performed to decrease the fibre diameter of the PS nanofibres. The concentration of PS was decreased so that the new solution was made up of 10 wt % PS in THF. In order to ensure that there was a significant decrease in the fibre diameter, approximately 1 mg of dodecyltrimethylammonium bromide (DTAB) was used per 10 ml solution. This significantly decreased the fibre diameter and the results can be seen in FIG. 8.

Further reduction to the wt % of polystyrene has occurred, with fibres spun with an 8 wt % PS in THF. Other factors that have been altered to create smaller fibre diameters were an increase in the distance between the syringe and collector from 20 cm to 30 cm.

With the nanofibres produced through electrospinning, it is important to observe the morphology and layout to determine if what is expected is being created. The initial fibres that were spun used the formulation described by Casper et al (referenced above), where they varied the range of humidity while maintaining a constant PS and THF solution. The breakdown of the precursor was 35 wt % of polystyrene dissolved in THF (Casper et al (referenced above)). Similar to the fibres that they produced, there is the appearance of pores on the surface of the fibres.

Figure 9:
FIG. 9 shows a micrograph of polyvinyl alcohol (PVA) fibres with a scale of 20 um electrospun from a solution of 10 wt % PVA dissolved in water at 80° C. at a rate of 2 ml/h and a potential voltage of 30 kV. The sample was kept at room temperature.

This effect may enhance the super-hydrophobic property of the fibres due to a larger surface area occurring, thus allowing for increased surface contact and porosity. The only issue with this first method of producing the nanofibres, which can be seen in FIG. 4, is the scale present for the nanofibres. The fibres possess the super-hydrophobic property; however further optimisation may be possible for achieving an effective transferable coating. In FIG. 9, it is evident that the fibres have an average diameter of 25 um, which is equivalent to what was observed by Casper, et al referenced above).

Figure 10:
FIG. 10 shows a micrograph of PVA fibres with a scale of 20 um electrospun from a solution of 10 wt % PVA dissolved in water at 80° C. at a flow rate of 2 ml/h and a potential voltage of 30 kV. The sample was placed in an oven and dried overnight at about 110° C. to remove excess solution residue.

The PVA layer may be formed from 10 wt % PVA dissolved in distilled water at 80° C. for up to three hours to allow for the polymer to fully dissolve while sitting on a heated stirring unit to maintain a constant solution temperature. Since the PVA layer is intended as a sacrificial layer, the consistency and optimisation for this layer is not paramount to the final product. The purpose is for the PVA layer to prevent any damage that could possibly occur to the PS layer during the attachment of the film to the surface or during storage or transport. Once the film is attached to the surface, due to its ability to be dissolved in water, this support is then removed to reveal the PS. FIG. 9 and FIG. 10 are examples of a surface morphology of the PVA.

As can be seen, the fibre diameter is not consistent, fibres are intertwined and large patches of solution are situated throughout the fibres. There is however a slight difference in the two scanning electron microscope (SEM) images. FIG. 9 was taken on a sample that was left to sit in room temperature which has meant that there is left over excess solution that can be seen throughout the material. In contrast, FIG. 10 was placed in heating unit at 108° C. overnight and it can be seen that some of the excess liquid that was present has been evaporated. The colour of the fibres was also altered. The dried fibres had changed from an opaque white to a slightly discoloured light brown colour.

Both the dried and undried samples were tested for solubility by placing a layer of water onto a corner of the fibres. Almost instantaneously, the fibres dissolved under both conditions.

Contact Angle Testing

Contact angle tests were conducted on a polystyrene nanofibre sample (35 wt % in THF) and a further polystyrene sample (8 wt % in THF) with a control test conducted on a sheet of steel to observe the contact angle experienced by an uncoated surface and the desired coating developed through lab testing.

Figure 11:
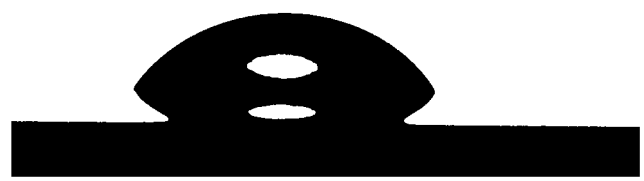
FIG. 11 shows a control sample, which is an uncoated steel slide with a single water droplet on the surface for calculating the contact angle (CA).

FIG. 11 is a control for all other experiments with the contact angle test to ensure that a base case is identified to be measured against. In order to prove that the polystyrene surface is hydrophobic or super-hydrophobic, which is an intention of this work, the contact angle required needs to be greater than that of the uncoated steel.

Figure 12:
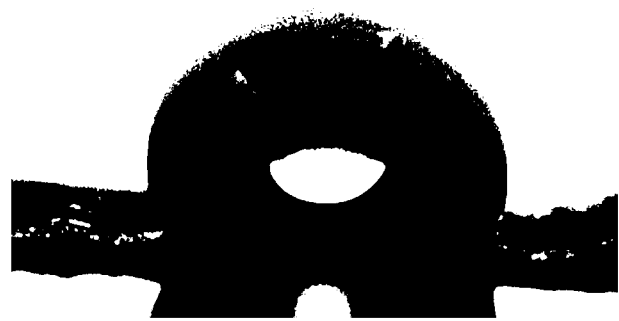
FIG. 12 shows a water droplet on the surface of polystyrene fibres created from 35 wt % solution of PS and THF, using electrospinning conditions of 4.2 ml/h and a potential of 10 kV.
Figure 13:
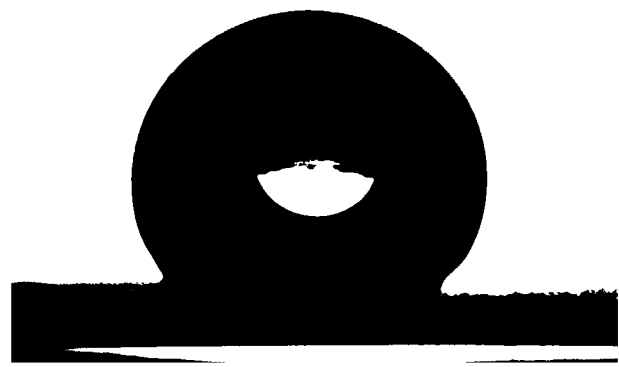
FIG. 13 shows a water droplet on the surface of polystyrene fibres created from 8 wt % solution of PS and THF using electrospinning conditions of 1 ml/h and a potential of 20 kV.

As can be seen in Table 1 below, a normal surface, such as steel that is uncoated has a contact angle between 50-60°. From the tests performed on the polystyrene layer which is intended to be super-hydrophobic (preferably with water contact angle >150° if a droplet of 10 ul is placed on its surface), it can be seen in FIG. 12 and FIG. 13 that with a decrease in percentage of PS used in the original solvent the surface becomes more hydrophobic. This effect can also be enhanced by decreasing the fibre diameter, which at present is not close enough to the optimised conditions that are desired for the project. Noted earlier in the SEM images, the 35 wt % polystyrene has an average fibre diameter of 25 um, which is significantly high considering that the aim is to reach 100 nm. Thus, FIG. 12 shows hydrophobic properties as it has a contact angle higher than 90°, but this may be improved further by a reduction in the fibre diameter. In comparison, FIG. 13 is testing the contact angle on 8 wt % polystyrene. The contact angle has increased and is between 137-144° which is close to a super-hydrophobic angle of 150°; but there are still improvements that can be made. These may be achieved by decreasing the polystyrene wt %, increasing the voltage and increasing the distance between the syringe tip and the roller (collector). However, the experiments described herein show increasing contact angle with decreasing the percentage of PS in the original precursor solution.

TABLE 1

Left and right water contact angles of the control (steel surface) and polystyrene nanofibres

| Surface | Left Contact Angle (°) | Right Contact Angle (°) |
|---|---|---|
| Steel | 55 | 57 |
| PS (35 wt %) flow rate of 4.2 ml/h | 121 | 123 |
| PS (8 wt %) flow rate 1 ml/h | 138 | 144 |

Figure 14:
FIG. 14 shows a coating as adhered on a glass slide (at 100° C. for 5 h)
Figure 15:
FIG. 15 shows a film electrospun onto aluminium foil.
Figure 16:
FIG. 16 shows the transfer of a tri-layer film from aluminium foil (on which it was electrospun) to a glass substrate. The photograph annotated as "attached" shows the film attached to the aluminium foil and placed on the glass substrate. The photograph annotated as "detached" shows the layer of material attached to the glass substrate by means of the attaching layer and the detached aluminium foil. Some holes were formed in the foil to facilitate dissolution of the PVA layer by water.

Making the Film, Attaching the Film to a Glass Substrate and Removing the Support The film of FIG. 14, FIG. 15 and FIG. 16 was made by electrospinning conducted as follows:

As-solvated PVA (10 wt %) with 25 kV, 11 cm, 2 ml/h, 20 min, 18 G needle.

As-solvated PS (8 wt %) with 20 kV, 20 cm, 1 ml/h, 20 min, 18 G needle.

As-solvated PVC (15 wt %) with 20 kV, 11 cm, 1 ml/h, 20 min, 18 G needle.

In respect of the above, the wt % refers to the weight percentage of the stated polymer in the solvent (THF). The kV figure refers to the voltage applied for electrospinning. The cm figure refers to the gap between the outlet of the needle and the substrate. The ml/h figure relates to the flow rate of the solution. The min figure refers to the electrospinning time. The needle size refers to standard needle gauges. For instance, an 18 G needle corresponds to 0.050 inches±0.0005 inches (1.270 mm±0.013 mm) nominal outer diameter, 0.033 inches±0.0015 inches (0.838 mm±0.038 mm) nominal inner diameter and 0.0085 inches±0.0005 inches (0.216 mm±0.013 mm) nominal wall thickness. The standard settings used in Casper were utilized. The settings for PVC was adjusted so as to promote better adhesion (tested independently using monolayers).

The three layers were electrospun on aluminium foil and attached to a glass surface by annealing at 100, 110, 120 or 130° C. for 5 h during application of a pressure.

Aluminum foil may be utilized to provide electrical contact during electrospinning and to initially collect the electrospun fibre. If the supporting layer is thick enough the three layer coating (support, nanostructured material and attaching layer) may be peeled away from the aluminium foil. Otherwise the coating may remain on the foil until the water-soluble support layer is at least partially removed.

The 3 layers exhibited good cohesion (the layers did not easily separate during subsequent storage or treatment processes).

These results demonstrate the transfer of the tri-layer film from the aluminium foil (where it was electrospun) to a glass substrate.

Layer of Polystyrene Fibres having a Contact Angle Exceeding 150°

Figure 17:
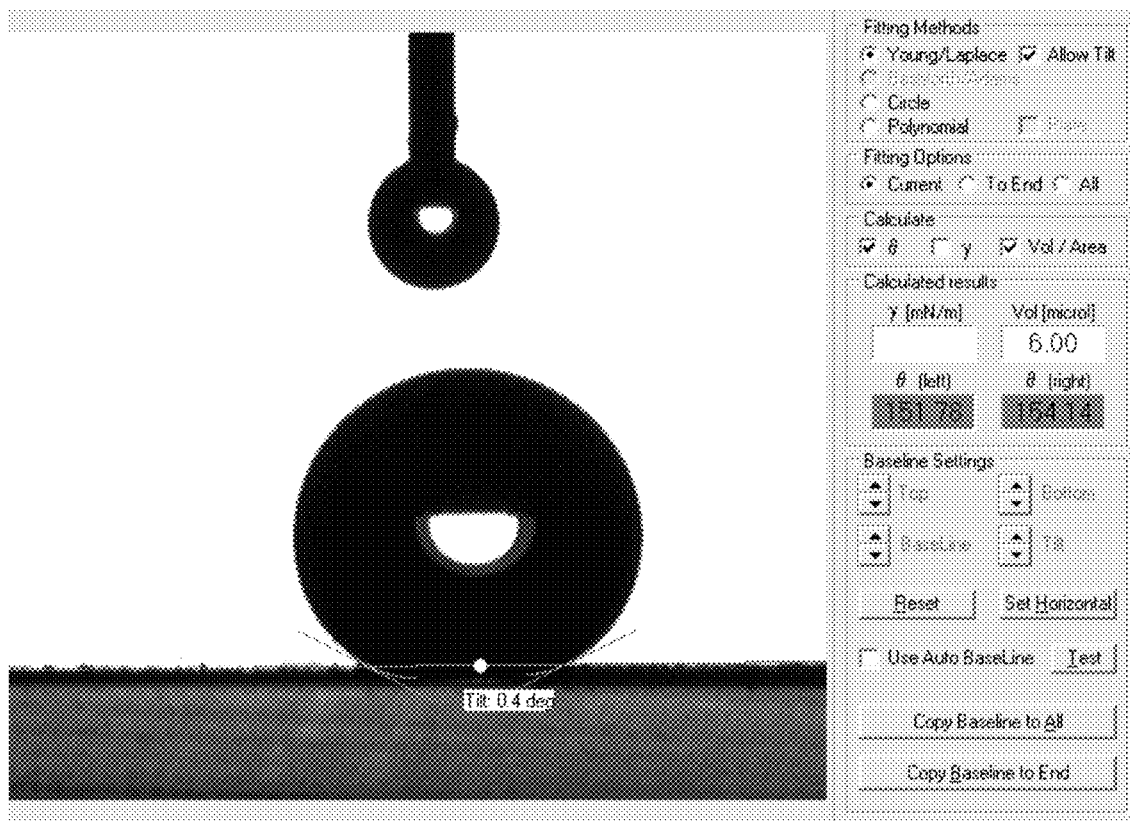
FIG. 17 and FIG. 18 show a water droplet on the surface of a layer of PS fibres created from 8 wt % (without DTAB) PS: 10 cm, 25 kV, 1 ml/h at 300-350 RPM spinning drum for 20 minutes.
Figure 18:
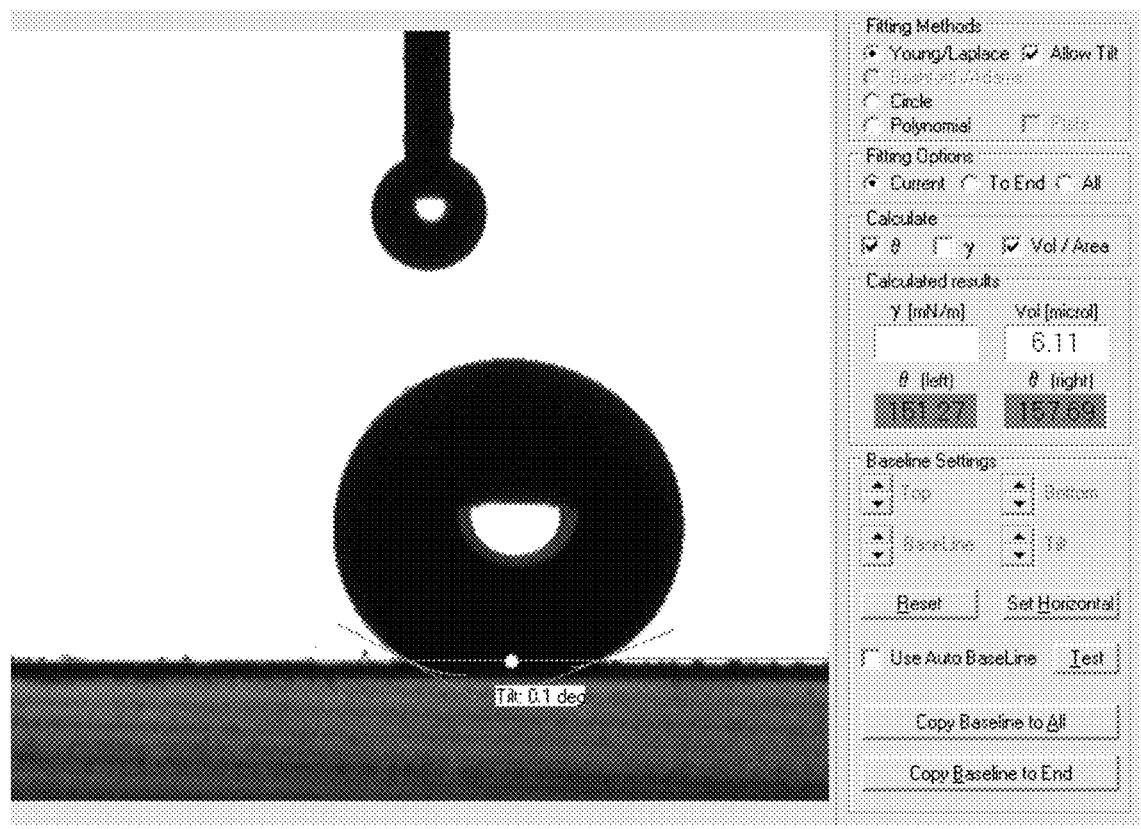

A layer of polystyrene fibres was formed on a spinning drum substrate (300-350 rpm) using the following conditions:

Electrospinning solution: 8% w/v polystyrene in THF (with no surfactant);
Distance from nozzle to substrate: 10 cm
Electrospinning voltage: 25 kV
Electrospinning rate: 1 ml/h
Electrospinning time: 20 minutes The resulting film was tested for contact angle by applying a water droplet to the layer of fibres. The droplet is shown in FIG. 17 and FIG. 18, which indicate that the contact angle was over 150°.

2. Examples of an Assembly of a Flexible Nanostructured Film with Optimised Bilayer Support and Attaching Layers, and Material Layers with Different Functionality The assembly and exemplary compositions of the layer are given below—see, for example, FIG. 2.

2A. Optimisation of the Bilayer Support

Figure 20:
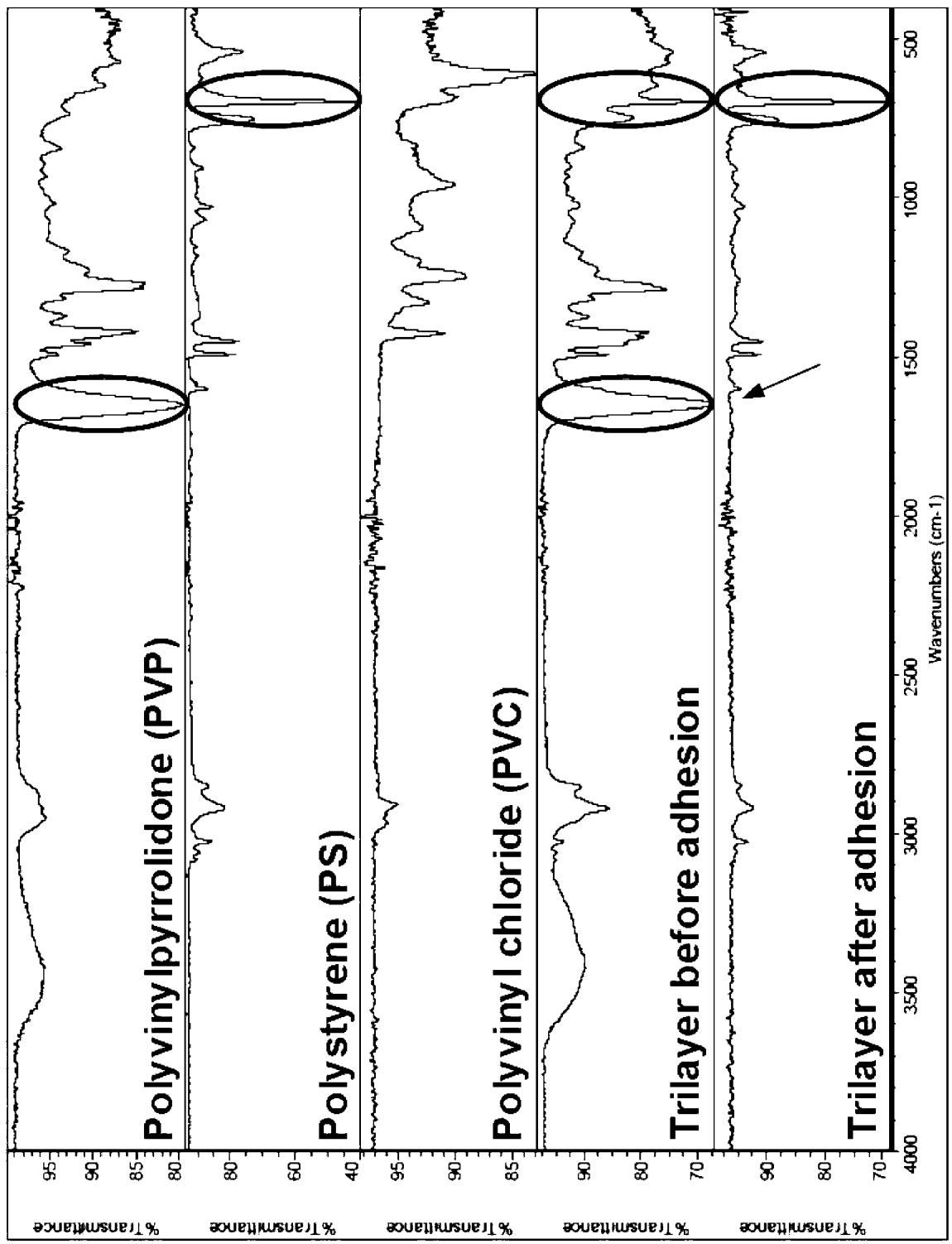
FIG. 20 is an FTIR (Fourier Transform Infra-Red) Spectrum on Tri-layers and Monolayer designs, as well as the transferred layer.

Further characterization of the support layer and its removal indicated that PVP was able to provide 3 key advantages over PVA as support or reinforcement layer:
1) Facilitated much easier removal and allowed the aluminum foil backing layer to be easily removed.
2) It was also easily spun into nanofibres, which proved highly effective in rapid dissolution.
3) FTIR analysis also showed that the PVP (see signature peaks at 1700 cm$^{-1}$) was acceptably removed with sufficient washing—ensuring that no residual component within the fibre layers remain after transferring (See FIG. 20).

A cellulose-based (paper) backing layer, incorporated into the bilayer support, was successfully developed and proved superior to aluminum foil. It performed well in terms of transfer requirements (heat and pressure) and made it possible to transfer a flawless surface. Additional advantages included:
1) Novelty of spinning nanofibres on paper—very few papers have reported in this area.
2) Clean transfer without need for perforations.
3) Rapid transfer (in the matter of seconds/minutes).
4) Transfer was possible without need for pressure or heat—demonstrating superior applicability for various other material layer types which may be sensitive to such parameters.

Nonetheless, if the application requires it, the same layer could be transferred with applied pressure and heat.

2B. Optimisation of the Fibrous Attaching Layer—Poly Vinyl Chloride (PVC)

Upon demonstrating and optimising the transferability, the inventors focused on the optimisation of the pure fibre system for PVC (attaching layer)—and found the following optimisations at both 10 and 15 cm (20° C. and 50-60% RH).

While the fibre domains were evident from 10-15 wt %, a choice was made to use 15 wt % PVC (with 25 kV) at 10 cm working distance. This has shown its reliability in fibre formation and performance. The formation of PVC fibres was deemed necessary due to the fact that fibre mats exhibit better mechanical stability during use (as compared to beaded fibres or beaded films). The use of fibres also allows a technique known as surface decoration (see section 2C(iii) below), which facilitated the ease of further modifications. Optimisation of the fibers also improved attachment, as outlined in section 3 below.

2C. Optimisation of Material Layers with Different Functionality

2C(i). Optimisation of Electrospinning of Polystyrene to Further Improve on Superhydrophobic Functionality The properties of material layers comprised of polystyrene, in different solvents plus or minus surfactants and electrospun under different conditions, was investigated.

2C(i)(a). PS in THF Produced Films Comprised of Beaded Fibers and Conferring Super-Hydrophobic Functionality with High Adhesiveness: The Rose Petal Effect The polystyrene—THF solution was first modified with surfactants (3.0 mg/ml of DTAB), and thereafter spun using variable conditions (electric field and polymer concentrations) in order to assess the optimal spinning condition.

The optimisation of polystyrene in THF was conducted with a variable electric field, with a working distance of 10 cm, between 5 wt % to 20 wt % PS in THF with 3 mg/ml DTAB surfactants. While this optimisation range effectively demonstrated that fibers could be produced at several regions of the optimisation, they remain relatively thick. The beading problem also remained prevalent despite the inventors' best attempts at using surfactants in increasing the overall conductivity of the spinning solution. Nonetheless, the inventors picked one of the more reliable conditions for contact angle analysis, of which 2 primary conditions were investigated:
A) Severely beaded structure intercrossed with multiple ultra-thin nanofibers—5 wt % at (0.5 kV/cm).
B) Slightly beaded fibers (beads on string)—8 wt % at (0.5 kV/cm).
C) These fibers (beads) were also analyzed via the Scanning Electron Microscope in order to properly ascertain the dimensions involved.

Figure 19:
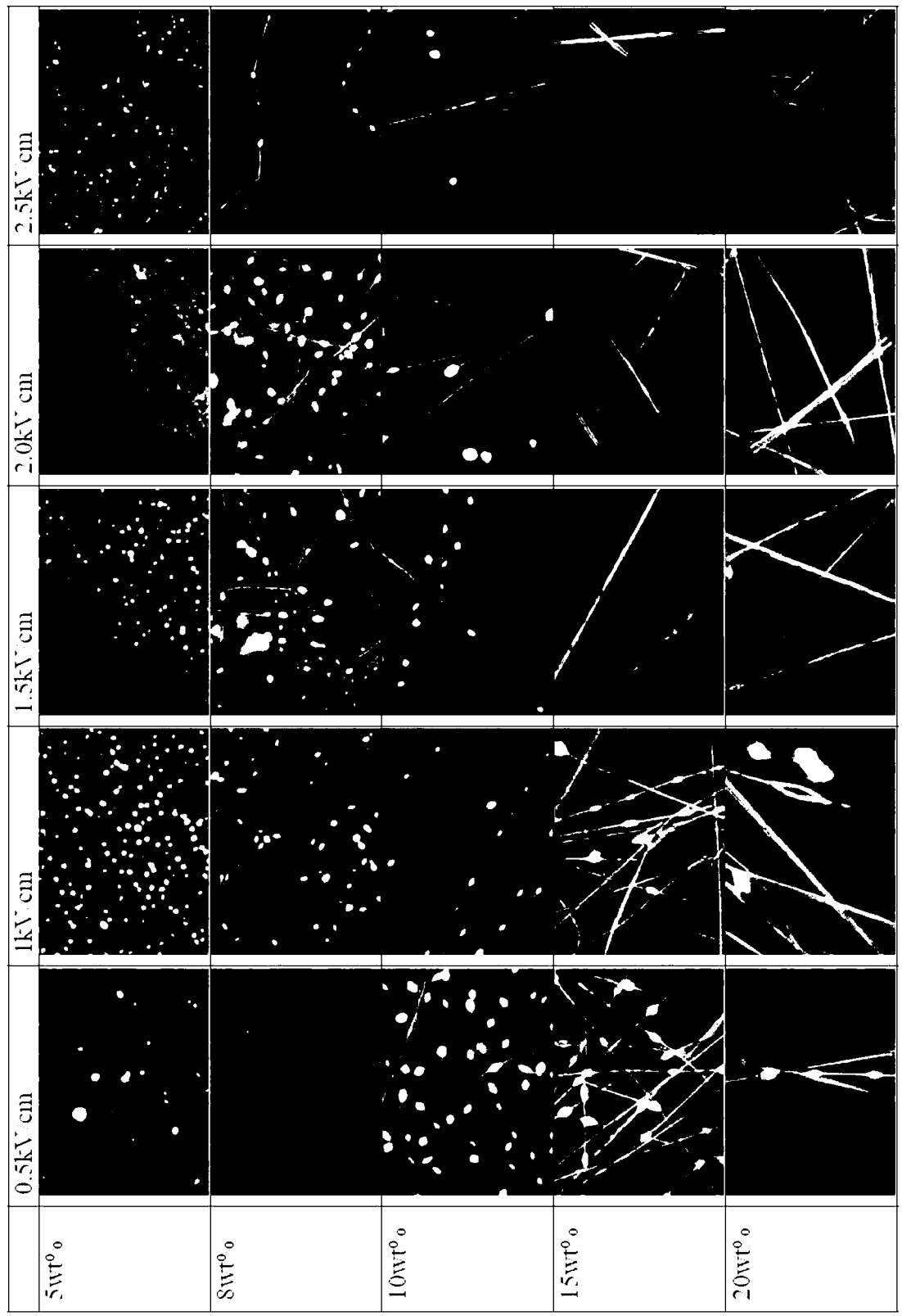
FIG. 19 shows polystyrene produced by electrospinning of polystyrene in THF with 3.0 mg/ml DTAB (varying wt % and effective electric field (kV/cm)) at 1 ml/hr, 10 cm—Relative Humidity (70-80%) at 500× magnification.

FIG. 19 shows how the nature of the electrospun PS varies as the concentration of the wt % and effective electric field are varied.

Evidently, an issue exists with regards to the contact angle of as-spun polystyrene fibers. The beads seem to confer super-hydrophobicity (156.4° with SD of 3.2°) while the pure fibre structure gave only 133.1° with SD of 4.3°. This has been accounted to the lack of sufficient hierarchical structures (pores and um-sized structures). The as-spun thin fibres (about 200 nm) were relatively smooth (with a surface morphology that was very different from the porous microbeads accounted for the super-hydrophobicity). An alternate sample from the optimisation matrix was then produced (at 10 wt % PS, 2.5 kV/cm)—which seemed to produce slightly beaded fibres. This region was chosen as a compromise between the pure beaded structures and the fibre-only structures.

Figure 21:
FIG. 21 shows clean droplet transfer from sticky super-hydrophobic surface 1, comprised of 10 wt % PS with DTAB (spun at 2.5 kV/cm) to sticky super-hydrophobic surface 2, comprised of 15 wt % PS with DTAB (spun at 2.5 kV/cm).
Figure 22:
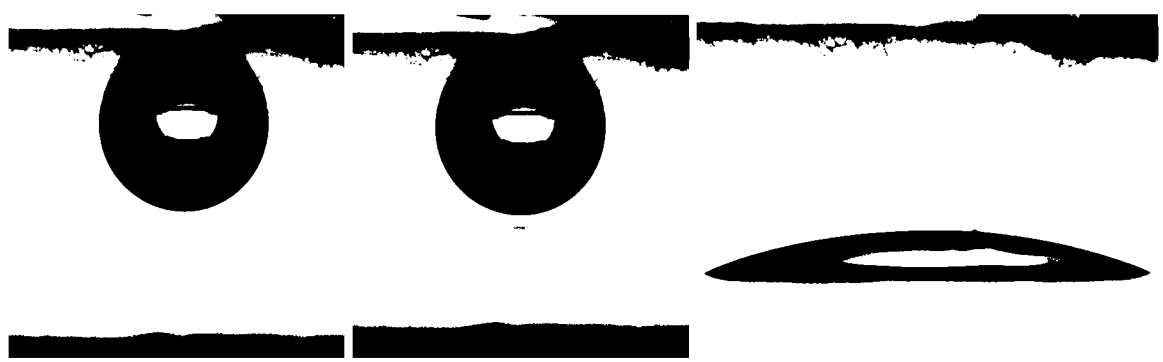
FIG. 22 shows clean droplet transfer from sticky super-hydrophobic surface 1 to hydrophilic substrate (glass).

This compromise was able to deliver a CA of 152.26° with a standard deviation (SD) of 5.5°, and represents the best achieved CA-fibre morphology combination in the PS-THF-DTAB system. The super-hydrophobicity of beaded PS fibres derived from THF is accounted for by the surface pores generated on the beads caused by nonsolvent-solvent penetration during exposure to the humidity in the environment. Fibrous and beaded layers of polystyrene have been devised for use as the material which may be nanostructured, and has resulted in the formation of a sticky super-hydrophobic layer comprised of dodecyl trimethylammonium bromide (DTAB) infused beaded fibres. The inventors were able to demonstrate various interesting microfluidics-based applications (microdroplet adhesion and transfer) across different surface types which the inventors have made (see FIG. 21 and FIG. 22).

These surfaces were also analyzed based on morphological modifications and pitch distances (extent of beading/fibre domains), which led to distinctively different behaviors under the sessile drop test (at 2 mm elevated impact). These data have been charted out as a table indicating type (fibre/beads/combined) and performance. The inventors currently understand that the original use of DTAB (for fibre development), led to enhancement in the stickiness of the super-hydrophobic PS surfaces, possibly due to its hydrophilic components.

2C(i)(b). PS in DMF Produced Material Layers Comprised of Nanofibers and Conferring Super-Hydrophobic Functionality with Low adhesiveness: The Lotus Effect The inventors' efforts in developing pure-fibre systems for super-hydrophobic performance was then shifted towards an alternate solvent system (DMF)—which is known for giving much higher conductivity and better fibre spinning properties. Moreover, the use of THF was originally intended for the formation of nanofibres with surface porosity. However, recent investigations revealed that thin fibres (100-200 nm)—are incapable of achieving surface porosity. Similar to the shotgun analysis used for PS in THF (w/surfactants), the inventors experimented with a series of spinning conditions: wt % and effective electric field (kV/cm). This optimisation range using PS in DMF provided better spinning morphologies, giving a larger region where fibres developed. In stark contrast to the system using THF, PS-DMF was able to produce fibres even at low polymer concentrations. The best samples (thin fibre diameter and suitable coverage—10 wt % at 2.0 kV/cm to 2.5 kV/cm) were also then repeated to ensure consistency. The contact angle achieved was 160°+/−4°.

The inventors believe that sufficiently thin nanofibrous polystyrene (<100 nm) would be sufficient in mimicking the actual macro-micro-nano roughness needed for super-hydrophobic performance. The layers of ultrathin polystyrene nanofibres in the formation of super-hydrophobic surfaces offer the added advantage that they form a homogenous surface with great mechanical stability and less light scattering relative to beaded surfaces.

Figure 23:
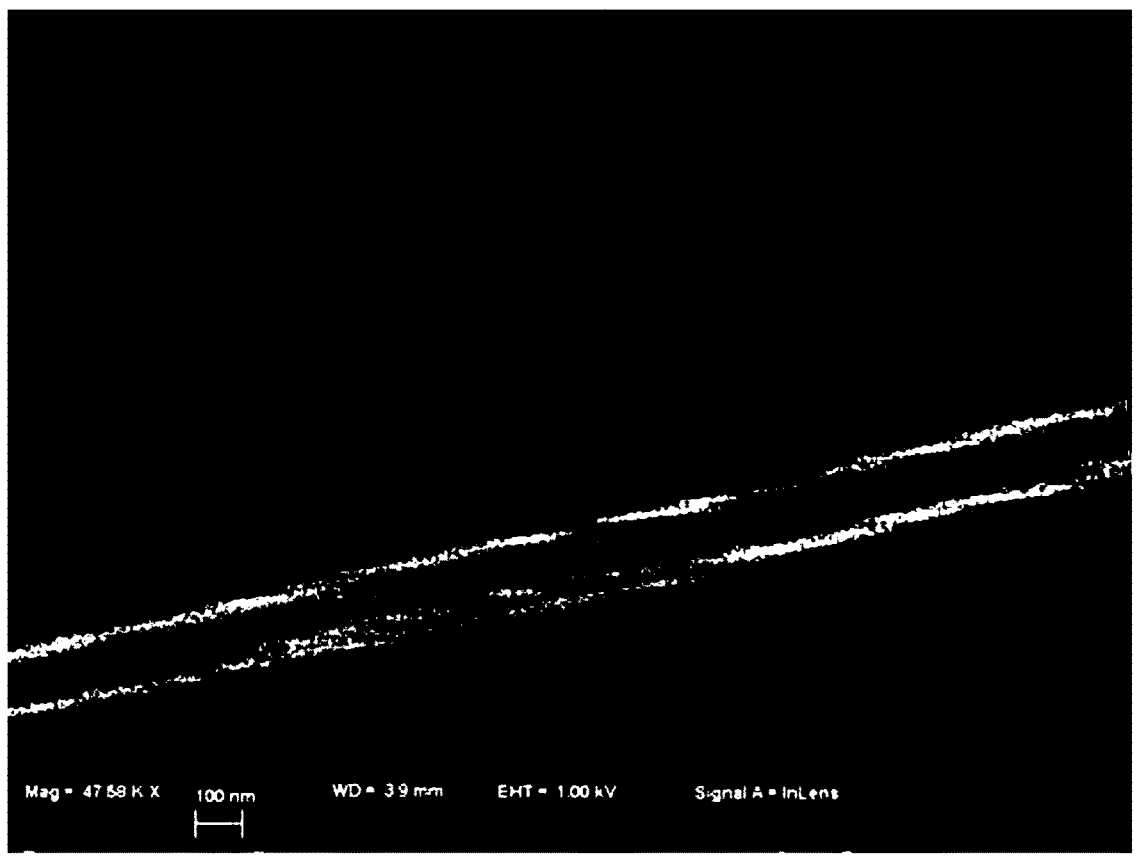
FIG. 23 shows as-spun PS (10 wt % PS in DMF, 2.5 kV/cm or 25 kV with a working distance of 10 cm) having optimum fiber diameter at about 100 nm.

SEM analysis revealed morphological structures essentially comprised of thin 100 nm thick fibres with relatively smooth surfaces as shown in FIG. 23.

2C(ii). Incorporation of $Mn_xO_y$ Nanoparticles in Electrospinning of Polystyrene Nanofibres as an Alternative Mechanism to Achieve Superhydrophobic Functionality Through the formation of only nanofibres, super-hydrophobicity may or may not be achieved (as per demonstrated in the use of 200 nm thick PS nanofibres). However, use of a thickened mat, combined with hierarchical roughness conferred by infused nanoparticles, is hypothesized to enhance this property. PS (8 wt %) in DMF was spun at 10 cm, 1 ml/hr at 25 kV (effective electric field of 2.5 kV/cm) with or without $Mn_3O_4$ nanoparticles.

The fibre mat spun without $Mn_3O_4$ gave a contact angle of around 155.5° with a SD of 7.1° while the fibre mat spun with $Mn_3O_4$ gave a contact angle of 164.8° with a SD of 4.6°. The fibre diameters in both mats are believed to be approximately 150-200 nm in dimensions based on previous estimates. These results indicate that high contact angle (>160°) indicative of superhydrophobicitymay be achieved using this method.

Figure 24:
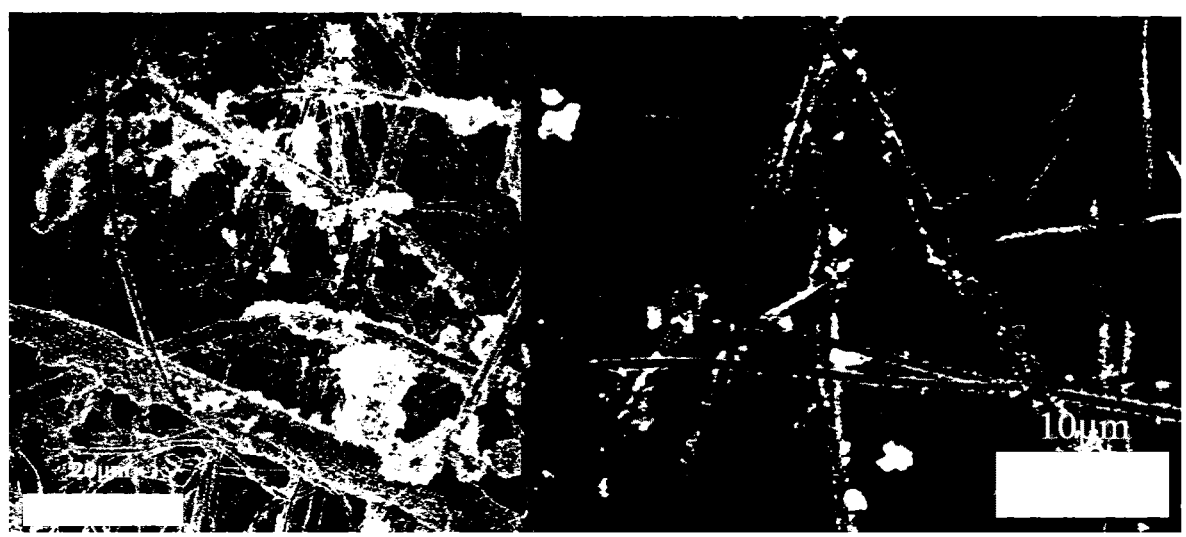
FIG. 24 shows a decorated fibre morphology i.e. fibres with added nanoparticles (post-flame spray pyrolysis) on a transferred film layer exhibiting superhydrophobicity.

2C(iii). Use of Flame Spray Hydrolysis to Produce Material Layers Comprised of Decorated Fibres and Conferring Superhydrophobic Functionality The inventors investigated a model which does not involve the electrospinning of nanoparticles, but utilized flame spray pyrolysis, to directly modify/decorate the outside of a nanofibre mat with inherently super-hydrophobic material (see FIG. 24), this could be achieved by many other methods such as impregnation, and low temperature spray coating.

This design represents an alternate experimental route which involves facile, scalable methods for the development of transferrable super-hydrophobic films. The combination of these 2 processes for development of thin functional films has never been reported. The inventors demonstrate based on an initial trial, the possibility of using electrospinning (to form the adhesive layer of PVC nanofibres, refer to section 2B above), and thereafter, via low-temperature calibrated flame spray pyrolysis (using manganese acetylacetonate as a precursor in acetonitrile) in forming a combined decorated melt layer which demonstrates super-hydrophobicity with ultra-low adhesion (FIG. 25) This flame-spray pyrolysis layer is generated directly and in situ on the PVP sacrificial layer augmenting the polystyrene material layer roughness. The PVC layer was then spun on the oxide based layer and used as per previously described.

Through the combination of electrospinning (PVP-PVC) sandwiching the material (manganese oxide), the inventors were able to demonstrate a surface which has very high static water contact angle, and exhibits an excellent sliding angle. Together with the pressure-heat transfer (100° C., 20 psi) during deposition or transfer stages, the bi-layer ($Mn_xO_y$—PVC) gave a polymer-stabilized layer, which has potential for better mechanical properties. Currently, the transferred layers were found to be water-stable which is a common benchmark for mechanically stable super-hydrophobicity films.

2C(iv). Use of Flame Spray Pyrolysis to Develop Material Layers that Confer Superhydrophobic, Mechanical Resistance, and "Peel Off" Functionality Two types of flame-spray (FSP) derived nanoparticle surfaces were developed and shown to have very good mechanical stability. Films were released using 2 techniques: water induced release (refer to sections 2A and 2B above) and direct peel-off of the paper—PVC bilayer support without using water.

Precursors were also varied (Mn and Zn) in order to demonstrate the versatility of the method. While the water induced release of materials did not give stable super-hydrophobicity, the counter-method (Peel off release) was surprisingly able to preserve key functionalities. One of the sample (Zn(Nph) in xylene (50 ml)) types was chosen and executed on a counter paper substrate (replacing glass) and was shown to perform similarly.

Figures 25, 26:
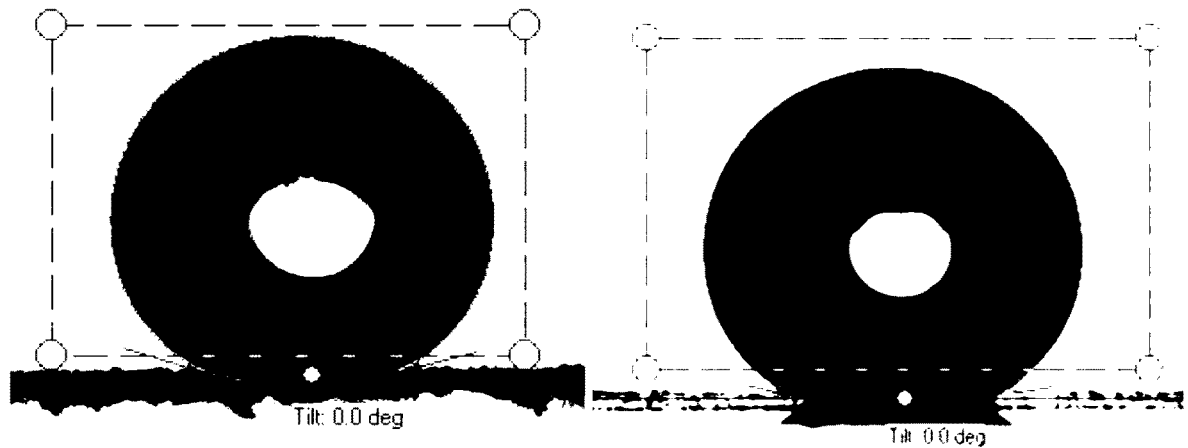
FIG. 25 shows the contact angle before (L) and after (R) transfer onto a decorated melt layer demonstrating superhydrophobicity with ultra-low adhesion on a layer made from manganese acetylacetonate as a precursor in acetonitrile has been deposited via low-temperature aerosol-deposition of flame spray pyrolysis generated aerosols. This system demonstrated 164-170° in static contact angle, sliding angle of <2° with a contact angle hysteresis (CAH) of <20° (based on tilt angle analysis).
FIG. 26 shows Flame Spray Derived Transferred Tri-Layers (on glass unless indicated otherwise).

These layers were effectively super-hydrophobic in definition (FIG. 26).

2C(v). Development of Material Layers that Confer Hydrophilic and Super Hydrophilic Functionality The inventors set out to develop a material layer that conferred hydrophilic functionality and that was compatible with the optimised multi-layer coating concept of the present invention. Such a material could therefore be used as the nanostructured material of the film described herein. Polycaprolactone (PCL) was the material of choice given that it can confer hydrophilic characteristics as well as function as a bio-compatible coating which could be usedfor growth of cells, encapsulation purposes or attaching coatings onto medical devices.

A variety of electrospinning conditions were trialled to derive optimal characteristics of the PCL layer on top of a bilayer support of paper and PVP. Following attachment to a substrate via the PDMS binding and PVC attaching layers, the structure of the material layer was examined by SEM after the bilayer support was peeled off, and the contact angle analysed.

Electrospinning conditions without and with DTAB produced material layers comprising different sized fibres (Table 2). In the absence of DTAB, the PCL fibres were relatively large (Table 2, FIG. 27A), with the top layers covered by a much thinner well interconnected fibrous layer which was determined by FTIR analysis to be residual PVP (data not shown). Contact angles were determined to be 109°+/−3.2°, and remained stable over time (Table 2, FIG. 27B).

In the presence of DTAB, the PCL fibres were about five times thinner (Table 2, FIG. 27C) and observed to form a highly porous nanofibrous material, that conferred unique "hemi wicking" properties in which a drop of water eventually attained a super hydrophilic contact angle of 0° (Table 2, FIG. 27D). Given the time required, this cannot be classified as traditional "super-hydrophilicity".

This PCL material layer electrospun with DTAB was further functionalised with silica using flame spray pyrolysis (Table 2). Silica was deposited for 1, 2, 3, or 4 minutes. As before, following attaching and removal of the bilayer support, SEM analysis indicated that the PCL fibres became progressively decorated by the silica as deposition time increased, to form a cake-like nanoparticle film after 4 minute deposition (Table 2, FIG. 27E). Water dropped on these cake-like films flattened onto the surface immediately thereby conferring traditional super hydrophilicity (Table 2, FIG. 27F).

C. Different temperatures (>100° C.) were trialed and tested to suit varying functional layer types.

Backing layer revised to Paper Towels: The paper backing layer was substituted with an ultraabsorbent paper-towel backing layer. The deposition conditions remained constant, improving detachment.

4. Optimisation of the Mechanical Stability of Film

The inventors have analyzed the mechanical stability of both native material (Table 3, type C) and Tri-layer variants (Table 3, types A and B) which is comprised of multi-layered nanofibrous coats (Table 3) synthesized on paper-based backing layers.

TABLE 2

Summary of main characteristics of the PCL based material layers

| Functionality the of material layer | Type A: Non wettable polycaprolactone (PCL) | Type B: wettable polycaprolactone (PCL) | Type C: Super-hydrophilic |
|---|---|---|---|
| Method and composition of material layer | Electrospinning of 6 wt % polycaprolactone (PCL) w/o DTAB. Spun at 15 kV, 15 cm at 1.5 ml/hr | Electrospinning of 6 wt % PCL w/ 3.0 mg/ml DTAB. Spun at 15 kV, 15 cm at 1.5 ml/hr | Flame Spray Pyrolysis of Silica on top of the Type B film: HAB: 54 cm Flow rate: 5 ml/min Pressure: 5.5 bar oxygen dispersion. Deposition time: 1-4 minutes |
| Components of multi-layer film | Bilayer (paper and PVP) removed PCL material layer PVC attaching layer PDMS binding layer | Bilayer (paper and PVP) removed PCL material layer PVC attaching layer PDMS binding layer | Bilayer (paper and PVP) removed PCL material layer super hydrophilic flame spray pyrolysis layer of silica PVC attaching layer PDMS binding layer (optional) |
| SEM of the surface of the material layer after attachment and removal of the bilayer support | Fibres comprised of PCL and residual PVP, 1.30 ± 0.50 µm in diameter. See FIG. 27A | fibres comprised of PCL, 190 ± 50 nm. See FIG. 27C | Cake-like nanoparticle film resulting from 4 min silica deposition. See FIG. 27E |
| Contact angles achieved on the material layer | Stable contact angle of 109° +/− 3.2 over a minute with 40 s shown. See FIG. 27B | hemi-wicking hydrophilic state reaching 0° after 40 s. See FIG. 27D | Surface produced from 4 min deposition produced a contact angle of 0° within 0.5 s. See FIG. 27F |

Figure 27:
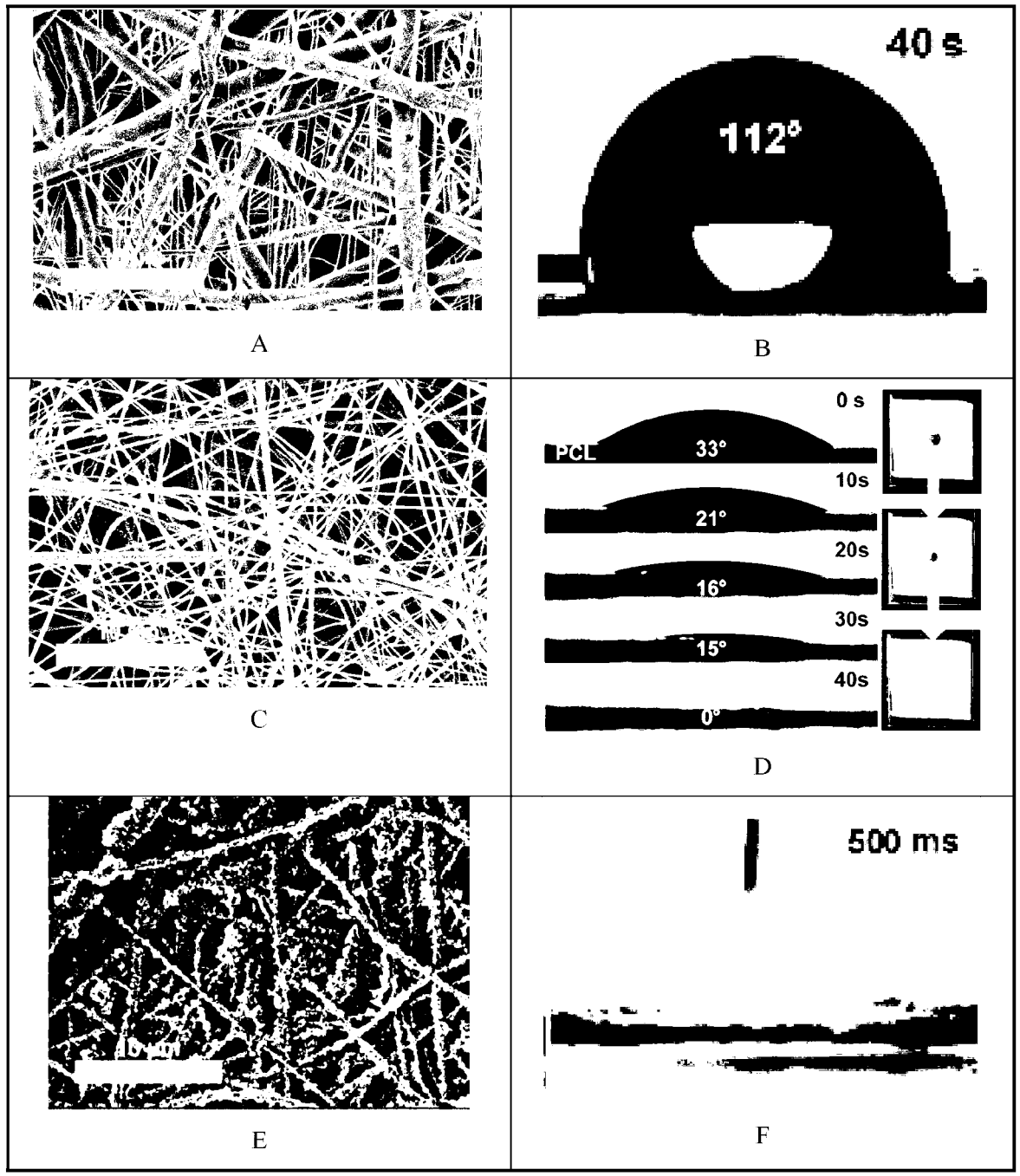
FIG. 27A to FIG. 27F are referred to in Table 2.

* Drawings for this table are in FIG. 27

3. Transfer of the Coatings Onto Various Surfaces

Figure 28:
FIG. 28 shows attached material on various substrates. Top row (L to R)—glass vial, glass substrate, copper, kapton polyimide (thermal resistant polymer). Bottom row (L to R)—PVC piping, cardboard substrate.

After developing the fibre-on-paper bilayer design (refer to section 2A), the inventors were able to execute the transfer of coatings on a variety of substrate materials—ceramics, plastics, metals, and even paper (See FIG. 28). The transfers were conducted under room temperature with neither pressure nor heat, revealing the versatility of the film transfer process. The transfers involved the use of the PVP-PS-PVC film.

Figure 29:
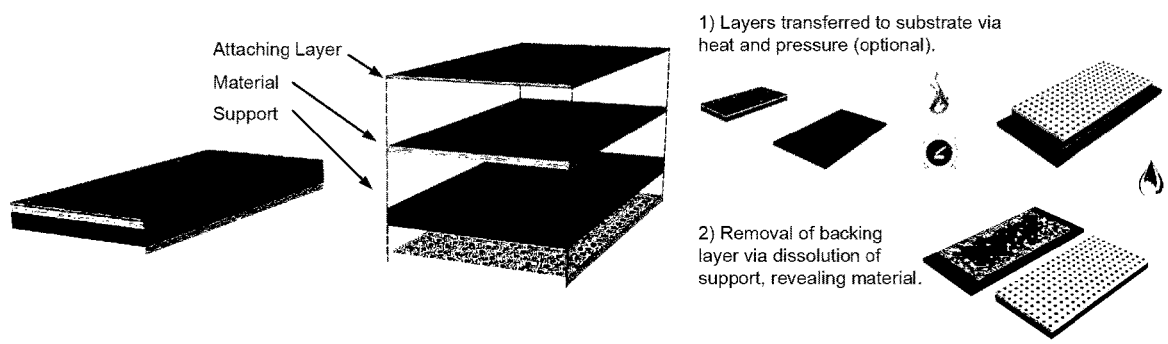
FIG. 29 shows on the left a tri-layer design with the use of paper backing layer and on the right the transferring of the support, material (nanostructured super-hydrophobic layer) and attaching layer (polyvinyl chloride, PVC) onto the surface of a substrate via heat and pressure, and dissolution of the backing and reinforcing layers (which together make up the support).

FIG. 29 shows on the left a tri-layer design with the use of a paper backing layer. FIG. 29 FIG. 29 shows on the right the transferring of the support, material (nanostructured super-hydrophobic layer) and attaching (polyvinyl chloride, PVC) layers onto the surface of a substrate via heat and pressure, and dissolution of the backing layer.

Optimisation of the transfer parameters: The use of PVC as the adhesion layer requires its melt-heating. A standardized pressure of 20 psi was used, together with an applied temperature between room temperature (RTP) to 100-150° a) Determination of Mechanical Stability of Coatings in Accordance to the ISO/ASTM Standards.

2 sets of coatings via the Tri-layer concept were developed and assessed in accordance to the ASTM D4060 method. The first set comprised of an unmodified Tri-layer construct (type A) while the second set involved the use of an adhesive binder agent (PDMS) which was applied as a bottom coat before using the Tri-layer as the top coat (type B). These coatings were quantified against a control which involved native as-spun materials (type C). As compared to the controls, mechanical stability of the Tri-layer coatings ranged upwards of more than 15 times improvement in performance. Synthetic parameters are highlighted in Table 1 below.

b) Coating Characterization for Mechanical Stability and Potential Risks Associated with Use.

Mechanical stability was characterized using cycles of abrasion damages. Pre and post wearthrough damages were assessed through a series of scanning electron microscopy (SEM) and contact angle (CA) analysis, which were used to qualify substrate wear-through.

In the following experiments, tests were conducted using a material with distinctive surface morphology, but without inherent super-hydrophobicity. Damage resilience and mechanical stability of these coatings are hypothesized to exemplify that of other potential material types.

Synthesis

TABLE 3

Synthesis Parameters for types A-C

| Layers | Type A (Tri-layer) | Type B (Tri-layer with binder) | Type C (Native layer) |
|---|---|---|---|
| Attaching Layer | 15 wt % polyvinyl chloride w/ 1.1 mg/ml DTAB. Spun at 25 kV, 10 cm at 1 ml/hr. | 15 wt % polyvinyl chloride w/ 1.1 mg/ml DTAB. Spun at 25 kV, 10 cm at 1 ml/hr. + (variable v/v) PDMS-THF spincoated layer | Nil |
| Material | 10 wt % polystyrene w/ 3.0 mg/ml DTAB. Spun at 25 kV, 10 cm at 1 ml/hr. | 10 wt % polystyrene w/ 3.0 mg/ml DTAB. Spun at 25 kV, 10 cm at 1 ml/hr. | 10 wt % polystyrene w/ 3.0 mg/ml DTAB. Spun at 25 kV, 10 cm at 1 ml/hr. |
| Support | 10 wt % polyvinyl pyrrolidone w/ 1.1 mg/ml DTAB. Spun at 25 kV, 10.5 cm at 1.2 ml/hr. | 10 wt % polyvinyl pyrrolidone w/ 1.1 mg/ml DTAB. Spun at 25 kV, 10.5 cm at 1.2 ml/hr. | Nil |
| Application Technique | 100° C. at 20 psi for 1 hour. Water dissolution of PVP releases the material. | Spin-coated PDMS-THF onto desired substrate. Adhered Tri-layer with paper backing layer onto the substrate. Water dissolution of PVP releases the sub-layers. Coated substrates cured in the oven at 60° C. overnight. | Coatings were as-spun onto substrates. |

The inventors' analysis of the pre- and post-damaged layers revealed enhanced mechanical stability attributed to the material layers through a combination of mechanical (compression) and adhesion (through the use of adhesive layers) modifications. Wear-through failure and risks associated with these coatings could easily be overcome using a further sublayer made of tough rubbery polymer binders.

Analytical Techniques for Mechanical Stability

Mechanical stability of coatings has typically been assessed through a few standard methods:

1) ASTM D3359—Adhesion by Tape Test.

This test involves the use of cross-hatching (cutting) a thin film, followed by using adhesive tape to quantitatively (within a rubric) assess the adhesive strength of a coating. Coating adhesion quality represents quality of a coating in protecting/decorating a substrate, and adhere to it for expected service life.

While this technique remains essential in the development of industrially applicable coatings, a few technical drawbacks exists when it is used to evaluate nanofibrous coats in the present invention:

a) The cross-hatch instrument is not sufficiently fine-edge to cut through a mat of nanofibrous mesh, resulting in tear-through damages, halting further analysis
b) Mechanical stability cannot be quantified in step-wise tests or deterioration of functionality, such as (super)-hydrophobicity. This test simply provides an adhesive rating, while important, remains overly superficial at this point in the development.

2) ASTM D968—Falling Sand Abrasion Test

The falling sand abrasion test comprises of a sand reservoir with a 36 inch long flow tube. Accelerating down the smooth bore tube, abrasive particles impinge onto the coating, wearing it down with time. This technique presents a step-wise damage analysis which is similar to the ASTM D4060, but with much greater variance. The loading of the sand, sand type and amount (accuracy of measurement) could lead to degrees of errors not repeatable between experiments. Today, older coatings are known to require 20 to 200 liters of sand for wear-through, while the more durable coatings would require up to 600+ liters (http://www.taberindustries.com/falling-sand-abrasion-tester). The potential variance and sources of human error in the measurements discouraged the use of this methodology in the analysis of coatings developed for the purposes of this invention.

3) ASTM D4060—Abrasion Resistance Test

The ASTM D4060 Abrasion Resistance of Organic Coatings Test is typically used in the industry for the evaluation of attached coatings. Ratings for this method have also been found to coincide acceptably with that in the ASTM D968. This method remains to be one of the most common analytical means in analyzing a wide spectrum of materials, such as plastics, coatings, metals, paper, leather etc.

The technique involves mounting a flat specimen onto a turntable platform which rotates on a vertical axis at fixed speeds (i.e. 60 RPM). The specimens are then abraded using Taber abrasive wheels (i.e. rated at CS-10) with a load (i.e. 250 g). Characteristic rub-wear action is produced through the contact of the specimen against the rotating wheels.

This method remains to be one of the most versatile methods (Multiple tests of varying intensity could be conducted with the Taber Rotary Abraser, namely, wear index, wear cycles per mil and cycles to failure. (http://www.abrasiontesting.com/case-studies/organic-coatings-astm-d4060/)) in the simultaneous analysis of both weak and tough coatings, as various settings could be altered to suit the needs of different materials. Configurations are listed below:
a) Abrasive wheels (Different indexes, CS-10, CS-17 etc.).
b) Cycle speed (0-60 RPM).
c) Load (250 g to 1000 g).
d) Cycle number (0-1000 cycles).

This method represents the most appropriate and configurable technique in analyzing a wide variety of coatings (from weak to tough).

Assessment and Optimisation of Mechanical Stability of the Material

The analysis of the Tri-layer concept (type A) versus the native as-deposited layers (type C) (a super-hydrophobic rose-petal like surface was primarily used in this investigation) were first cross-compared through optical analysis, and thereafter via parallel contact angle (CA) (5 ul sessile drop technique). Due to the heterogeneous mode of damages impacted by the ASTM D4060 test, 2 substrates (1 in 2) were abraded simultaneously, with 4 droplets being measured across the centre-line of each damaged zone—cyclic abrasion testing. The same material under both delivery concepts were compared through continuous contact angle—cycle abrasion testing, carefully mapping out contact angle fluctuations in each before and during sets of wear cycles.

Taber Test: "ASTM D4060 Standard Test Method for Abrasion Resistance of Organic Coatings". Wear cycles were conducted via a pair of CS-10 Abrasive Wheels (Taber Industries, USA). The cycles to failure (as highlighted in ASTM D4060) could be easily determined from a sharp drop in contact angle (or variations amidst the cyclic testing). This is termed wear-through failure from hereon. The surfaces were then analyzed via scanning electron microscopy (SEM) to establish an understanding towards improvements in damage resilience. Thereafter, stabilization of the Tri-layer was attempted by post resin-impregnation. These stabilized films were then analyzed through the same sequential characterizations—Optical, CA-Taber, SEM.

Optical Analysis—Tri-Layer (type A) vs. As-Spun Native Layers (Type C)

The native layers were first analyzed against the Tri-layers (Table 3, type A) through optical microscopy. The native layers were found to be less compact as compared to the Tri-layer post transference. This is attributed to the use of high pressure (20 psi)—heat (100° C.) conditions used in performing the transfer (Table 3 Table 3).

Abrasion—CA Analysis—Tri-Layer (Type A) vs. As-Spun Native Layers (Type C)

Figure 30:
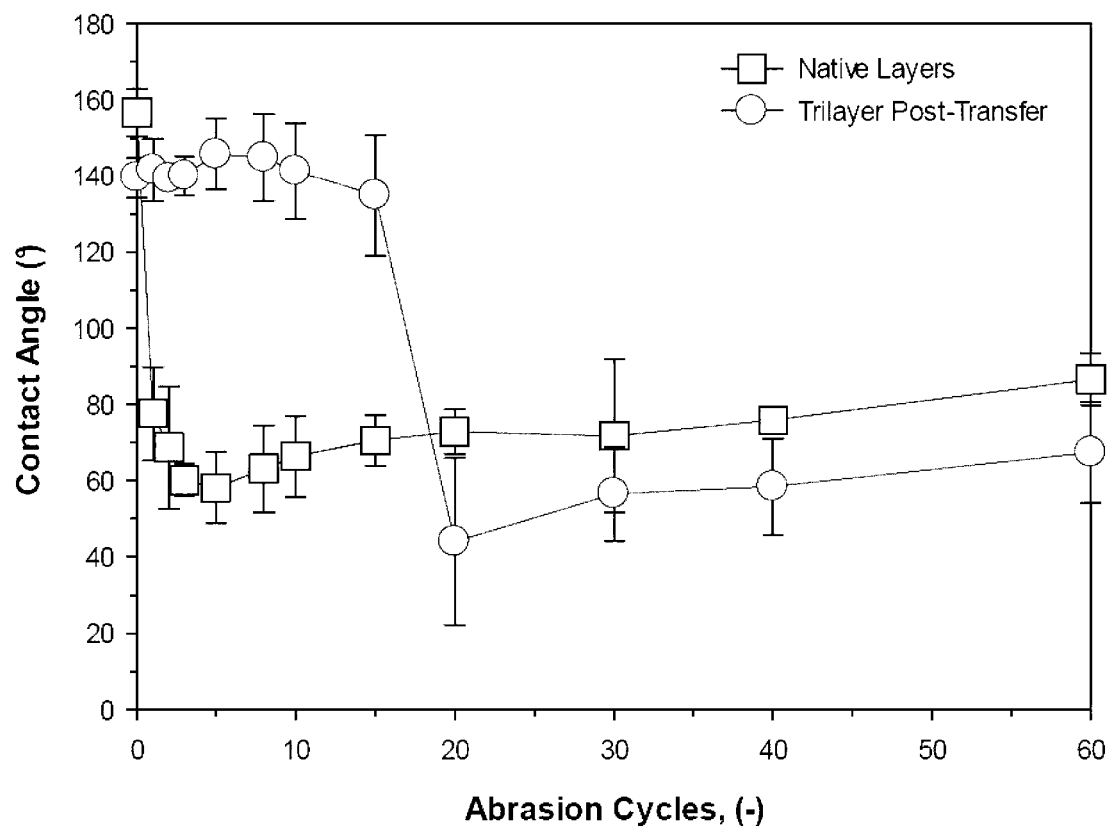
FIG. 30 is a graph showing the abrasion cycle dependence for Native Layers vs. Tri-layers of the contact angle.

Abrasive cycles on native layers and post-transferred Tri-layers revealed drastic improvements to the stability of the material (FIG. 30). Native layers were destroyed after the first abrasive cycle, with a drop in contact angle from ~156° to 77°. This is largely attributed to the following factors:
1) lack of abrasion resistance by native hierarchical structures,
2) lack of adhesion to the substrate material without a binder layer (Table 3).

Substrate wear-through was thus accomplished at <1 cycle. The abrasion resistance of the native layer was noted to be enhanced 15-20 folds for the Tri-layer design. Substrate wear-through was only experienced between cycles 15-20, with a drop in contact angle from 135° to 44°, although the original average CA (pre abrasion) of these films was slightly below 150°.

This demonstrates the efficacy of the means for transferring and adhering the material through the Tri-layer, which provides the following functions:
1) A sandwiched material that prevents damage to the material during storage, transport and application,
2) Compression of the material into a relatively more compact and abrasion resilient structure. By comparison, attempts made to compress a native layer would result in film detachment and damages.
3) The PVC adhesion layer provides a sub-material layer which prevents rapid substrate wear-through while cushioning further damages caused to the material layer.

SEM Analysis—Tri-layer (type A) vs. As-Spun Native Layers (Type C)

Figure 31:
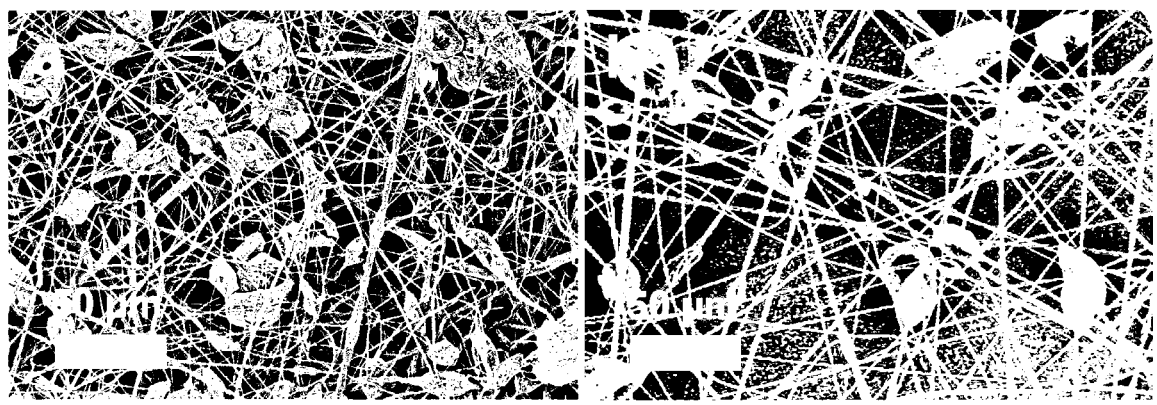
FIG. 31 is an SEM analysis at Cycle 0 (pre-abrasion) of (a) (type A, Tri-layer) and (b) (type C, Native layer). The type A tri-layer and type C native layer are as described in Table 3.
Figure 32:
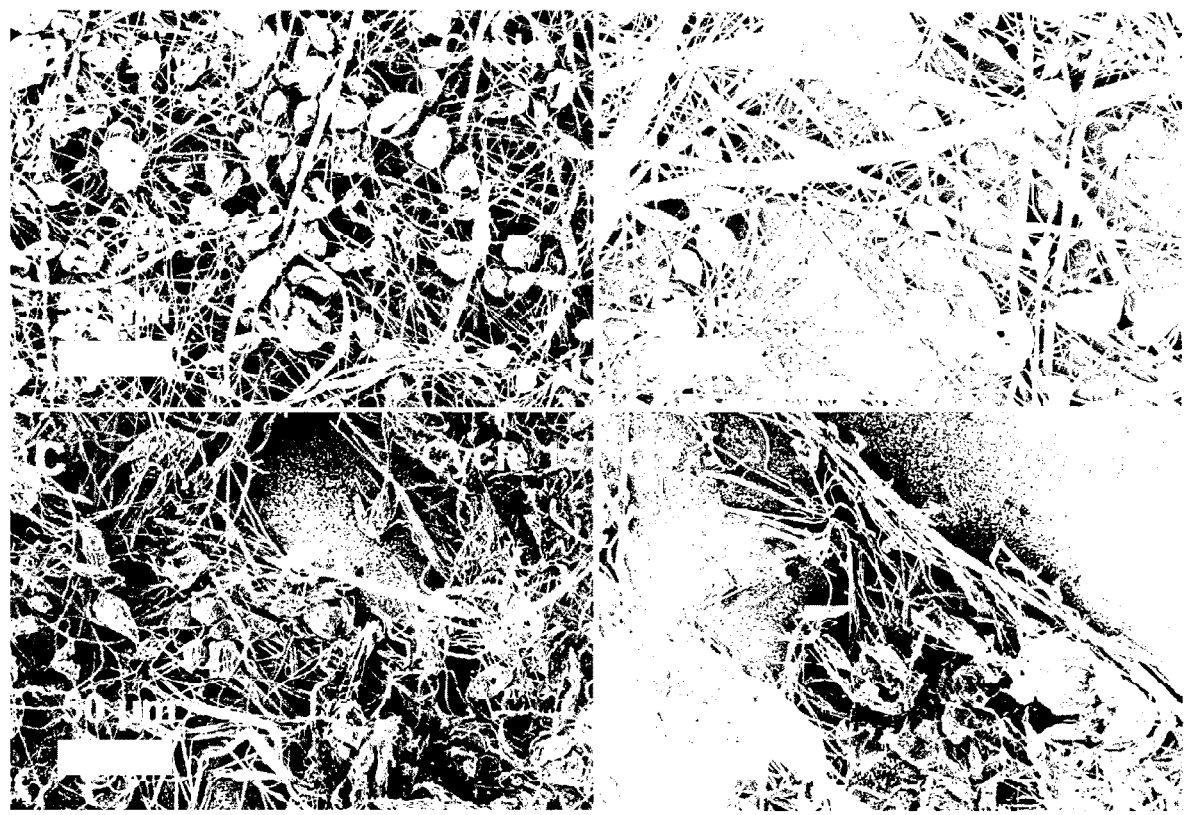
FIG. 32 is an SEM analysis showing abrasion damages to the type A Tri-layers—a (cycle 1), b (cycle 5), c (cycle 15) and d (cycle 20). The type A tri-layer is as described in Table 3.

SEM analysis of the native layers (type C) and Tri-layers (type A) provided greater understanding to the pre- (FIG. 31) and post-damage (FIG. 32) for the Tri-layer design. SEMs were not conducted on the damaged native layers as the mesh was completely removed.

No damages could be identified after the 1st cycle (FIG. 32a), as reflected in the contact angle analysis. Damages at the fifth cycle were also not severe, with no evidence of substrate wearthrough.

However, the sublayer of PVC was slowly exposed, showcasing erosion of the material layer (FIG. 32b). Between Cycle 15 and Cycle 20, large domains of substrate wearthrough was observed, where the underlying glass substrate was slowly being exposed (FIGS. 32c and d). These observations were confirmed by the contact angle—abrasion cycle data (FIG. 30).

High magnification analysis of the damaged areas revealed distinctive fibre breakage and bead flattening. Beads with original hierarchical structures were gradually abraded by the abrasive wheels, leaving behind flat structures. Fibre breakage was the other major damage cause.

Application of Adhesive Hydrophobic Binder Layer (Polydimethylsiloxane, PDMS)

Given the multi-layer adaptability of the Tri-layer construct, further attempts were made to improve the layers' adhesion to substrates. One of the primary means explored was the use of an additional binder layer (Tri-layer with binder, type B), in this case, polydimethylsiloxane (PDMS). PDMS is a rubbery polymer which is easily available in a pre-cured solution. Incorporating a rubbery polymer into the framework of abrasion resilience provides a fundamental property to improve toughness of the hierarchical network. (In materials science, toughness is defined as the ability of a material to absorb energy and plastically deform without fracturing. Resistance to fracture was evidently required in the use of fragile hierarchical materials).

A PDMS layer of varying thicknesses, controlled by PDMS v/v concentrations—with solvent tetrahydrofuran (THF) was deposited on the desired substrate through spin-coating (2000 RPM, 30s) prior to transferring the material layer through a water-induced, heat-less, pressure-less process (Table 3). The resulting coatings were then optionally heat-cured in the oven at 60° C. overnight after transferring the Tri-layer onto the spin-coated pre-cured layer of PDMS (Table 3).

Optical Analysis—Tri-Layer with Binder (Type B)

The optical images revealed the varying degree of binder penetration (darkened coloration) into the sub layers of the nanostructures. The use of 30-40% of PDMS-THF solution would result in partial penetration while anything from 50-100% completely engulfs the surface. The degree of penetration with respect to binder concentration was repeatedly observed in a variety of nanostructured surfaces.

Abrasion—CA Analysis—Tri-Layer with Binder (Type B)

Cyclic abrasion—contact angle analysis revealed an interesting trend that was largely unexpected from the Tri-layers with binder (type B). From the onset, the partially penetrated layers exhibited very low contact angles, which can be attributed to the expansion effects of curing PDMS on the topmost material layer, resulting in a pore widening effect within the material layer after the PDMS cured, thus leading to initially enhanced capillary effects and water seepage. The use of PDMS led to a distinctive wrinkling effect on some of the tri-layer with binder films. While this effect was particularly pronounced at the use of a binder at 20% v/v PDMS, it is believed to have a general impact on all binder enhanced films.

Figure 33:
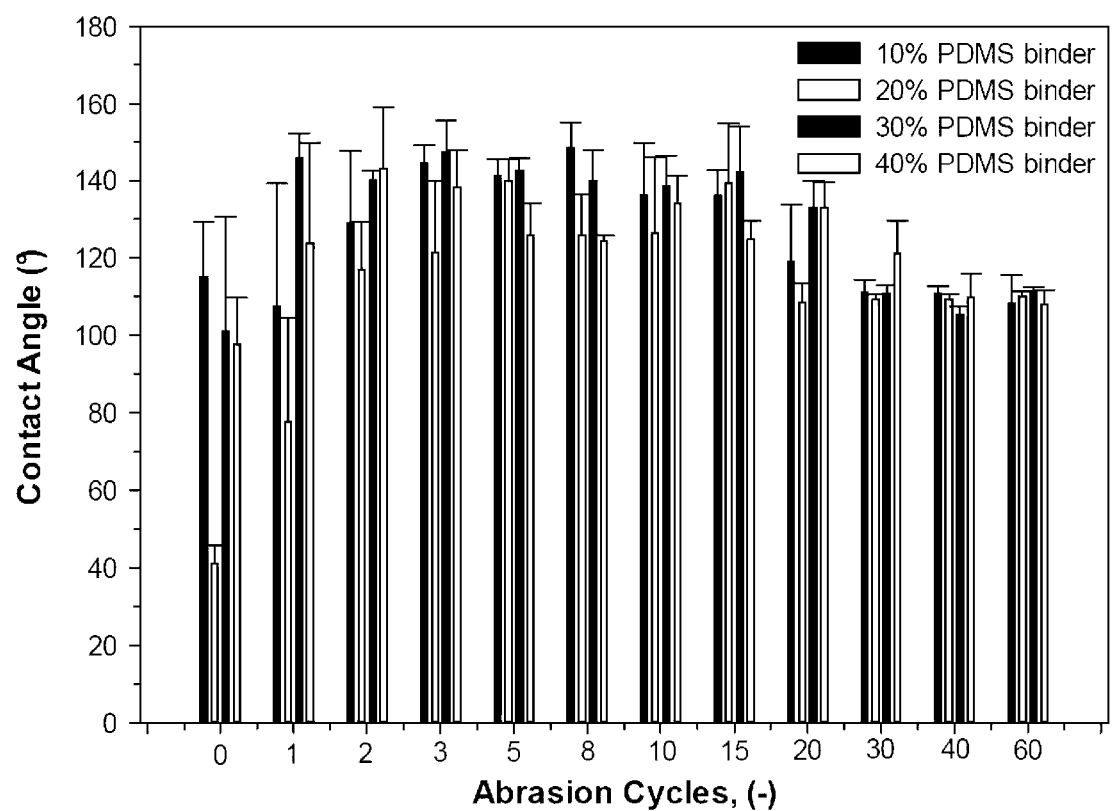
FIG. 33 is a graph illustrating the abrasion cycle—contact angle dependence for low-concentration PDMS impregnation (10-40%) used with Tri-layer (type B—Tri-layer with binder as described in Table 3).
Figure 34:
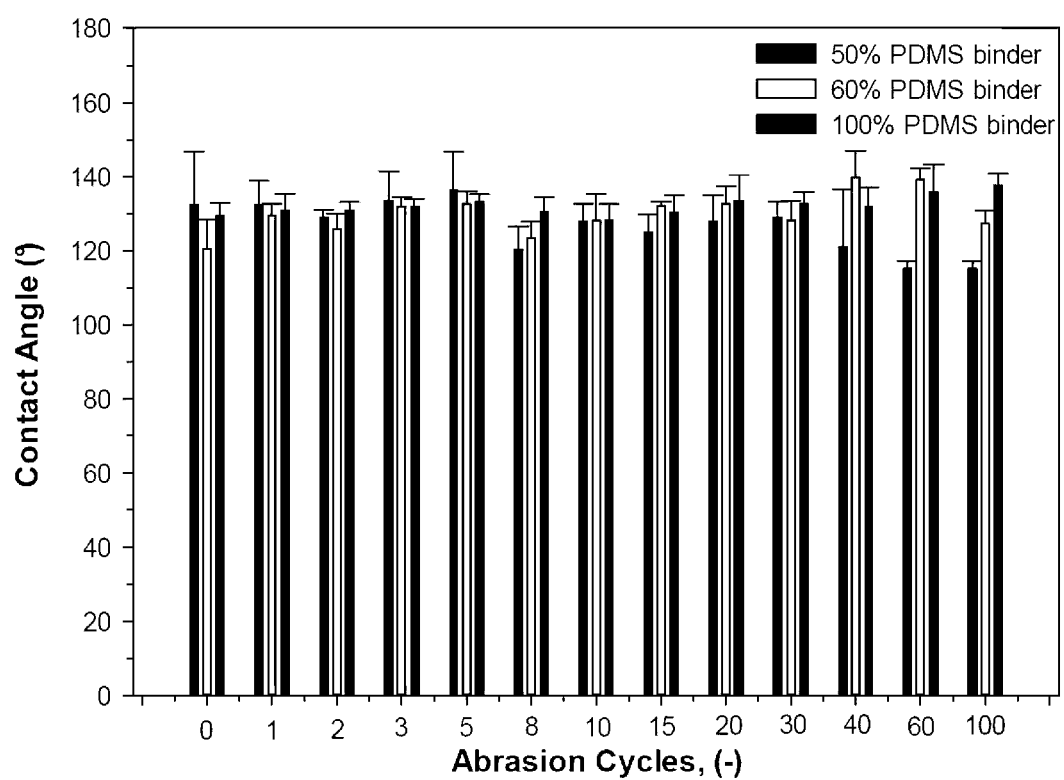
FIG. 34 is a graph illustrating the abrasion cycle—contact angle dependence for high-concentration PDMS impregnation (50-100%) used with Tri-layer (type B—Tri-layer with binder as described in Table 3).

With specific reference to FIG. 33, while the type B Tri-layer with binders (10-40%) were able to maintain a substantially high effective contact angle during midcycle damages (cycles 2-20), it appears that the initial contact angles achieved were substantially lower than the native or the binder-less type A Tri-layers (FIG. 33, Columns 0, 1 and 2). However, upon erosion of the top layers belonging to the PDMS-induced hydrophilicity in the low concentration (10-40% v/v PDMS) impregnated layers, they quickly retained/reverted to hydrophobicity (~140°). Thereafter, layers belong to the PDMS-fibre interfacial layers performed similarly to that at 50, 60 and 100%, thus resulting in the re-attainment of hydrophobicity. This trend was observable (as an N-shaped curve) for all partially impregnated layers. In contrast, the fully impregnated layers (50, 60 and 100% v/v PDMS) were able to maintain a reasonably high contact angle (~130°) at the onset (FIG. 34).

Upon abrasion, these fully impregnated Tri-layers with binders (type B) exhibited a relatively flat but high (>120°) CA-abrasion trend, attributed to the increase in toughness by the PDMS in encapsulation.

However, most of the CA values measured throughout the cycling did not achieve much variance, signifying minimal damages or impact on the as-formed films (type B, Tri-layer with binder (50-100%)) throughout testing (0-100 cycles). Error bars were also much smaller (FIG. 33 and FIG. 34), indicating a much greater homogeneity in surface properties in the latter.

Figure 35:
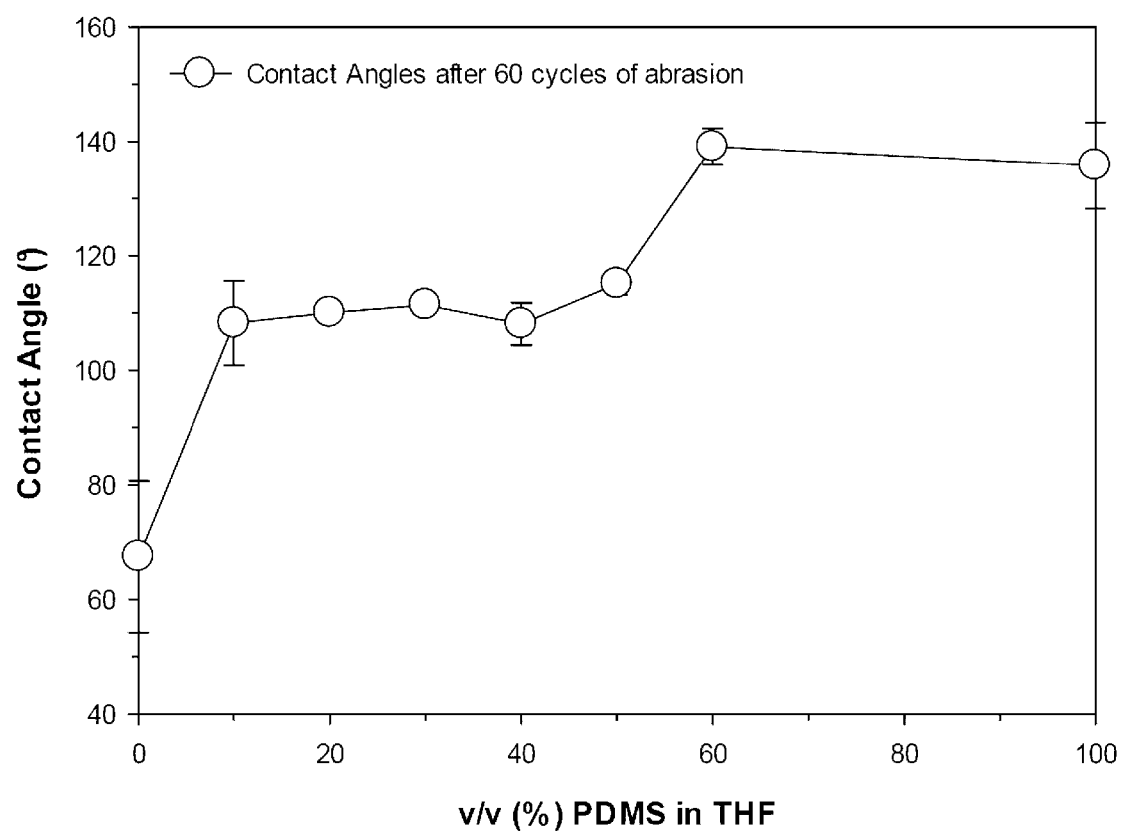
FIG. 35 is a graph representing contact angles achieved upon 60 cycles of abrasion for type A (Tri-layer) and B (Trilayer with binders) coatings as a function of the v/v % of PDMS-THF binders used.

The contact angles (after 60-100 cycles) had an increasing trend with increasing impregnation concentration, showcasing the higher stabilities achieved by higher concentrations of PDMS impregnation (FIG. 35). All values were substantially higher (~110°-135°) than those developed without PDMS—native layers and Tri-layer (~70°) due to complete substrate penetration, revealing glass. By comparison, pure PDMS films have been reported to possess contact angles of between 90-120°, most commonly reported within 105-115° (A. Mata, A. Fleischman, S. Roy, Biomed. Microdevices 2005, 7, 281). The persistently high contact angles at 135° even after a hundred cycles represent some surface distortion effects by the embedded fibres of the trilayers.

The use of the Tri-layer with binders has clearly showcased its ability to preserve essential surface functionality even after severe abrasion damages. Analyzing the abrasive mechanisms causing the loss of hydrophobicity in fibrous films, SEMs provided different perspectives on both the use of low and high concentrations of PDMS as binder.

SEM Analysis—Tri-Layer with Binder (Type B)

At the use of a low concentration PDMS-THF binder solution (10% v/v), the damages from cycles 0 to 15 were significant, but did not remove the top material coat, similar to observations in the Tri-layer design. At the 20th cycle, the top material coat was completely obliterated, revealing sub-penetrated layers, with fibres encased within a tough PDMS-resin matrix. Contact angle analysis supports these findings, demonstrating a gradual drop in CA measurements beyond the 15th cycles.

When a more penetrated binder coating was used (40% v/v PDMS-THF), the surface fibrous morphologies remained, but as penetrated up to the edge of the material layers. However, cyclic abrasion quickly removed any traces of the loose non-impregnated material layers, allowing only the impregnated layers to be preserved. This could have occurred through a PDMS ironing process or simply surface asperity damage. This was likewise reflected, marginally in the contact angle analysis, where values after the 5th cycle demonstrated much lower variance (FIG. 33).

The fully-impregnated surfaces (60% v/v PDMS-THF binder) displayed only marginal presence of remnant surface morphology upon synthesis. Upon 100 cycles of abrasion, these surface morphologies remained but appeared to be somewhat further flattened.

These results, nonetheless, revealed the potential behind the use of a tough polymeric based binder, which easily remained on the surfaces (showcased by SEMs and CA analysis) through entire 100 cycles (and possibly more).

While these findings support the use of PDMS-THF or other conceptual binding agents as bottom coats, more experimentation and trials are needed to ensure both mechanical stability and functionality.

Conclusions: Mechanical Stability of Native and Functional Layers

Here, the inventors have quantified the abrasion resistance behind the Tri-layer design, with and without binders. As compared to an unmodified native as-spun material, mechanical stability of the Tri-layer coatings was improved beyond a range of 15 times in performance. While superhydrophobicity was not achieved reliably in all surfaces with modified adhesion (Tri-layer with heat adhesion or Tri-layer with binders), robustness of surfaces were significantly improved.

A comparison with the native material with a CA~152°, would reveal enhanced robustness ranging from in excess of 15 times (Tri-layer) and up to a 100 times (Tri-layer with binder (100% v/v PDMS)). The native material, while super-hydrophobic before cyclic testing, was completely destroyed within 1 cycle of abrasion.

While wear-through damages were evidently present in the original Tri-layer design upon 20 or more abrasive cycles, the use of rubbery polymer binders (PDMS) with the Tri-layer has demonstrated the potential in providing even longer-lasting substrate protection. These enhanced coatings were found to be easily on the range of 15 to 100 times more abrasion resistance than the native as-developed nanofibrous hierarchical coatings. Hierarchical structures were also clearly preserved in both the Tri-layer concept and the Tri-layer-binder (low concentrations) trials.

Wear damage to the nanofibrous layers clearly involved flattening and tearing of nano-micro structures, gradually eroding layers of meshes until substrate wear-through. Risks inherent to the use of this design may involve the degree of substrate sensitivity after wear-through (i.e. corrosion protection). The use of a binder layer, however, has demonstrated great potential in the prevention of substrate wear-through, and represents a viable solution towards more sensitive applications.

Although the invention has been described in connection with a preferred embodiment, it should be understood that various modifications, additions and alterations may be made to the invention by one skilled in the art without departing from the spirit and scope of the invention as defined in the appended claims.

The invention claimed is:

1. A film for attaching a nanostructured material to a surface of a substrate, comprising:
   (a) a removable support;
   (b) an attaching layer for attaching the film to the surface of a substrate, wherein the attaching layer has a thickness of less than about 1 µm; and
   (c) the nanostructured material directly coupled to the support and the attaching layer, wherein the nanostructured material is not self-sustaining and wherein the nanostructured material has a porosity of at least about 60%.

2. The film of claim 1, wherein the nanostructured material is disposed between the support and the attaching layer.

3. The film of claim 1, wherein the nanostructured material and the support are intermixed and disposed on the attaching layer.

4. The film of claim 1, wherein the support is soluble in a solvent which does not dissolve the nanostructured material.

5. The film of claim 1, wherein the support is removable by radiation.

6. The film of claim 1, wherein the support comprises at least two layers.

7. The film of claim 1, wherein the attaching layer has a lower melting point or a lower softening point than the nanostructured material.

8. The film of claim 1, wherein the nanostructured material comprises nanofibres.

9. The film of claim 1, wherein the nanostructured material has a specific surface area of 1 $m^2/g$ or greater.

10. The film of claim 1, wherein the nanostructured material is super-hydrophobic.

11. The film of claim 1, wherein the nanostructured material is super-hydrophilic.

12. The film of claim 1, wherein the nanostructured material has a thickness of 200 nm or less.

13. The film of claim 1, wherein the nanostructured material is transparent.

14. A method for making the film of claim 1, the method comprising
   providing a support,
   forming a nanostructured material onto and/or into the support, and
   depositing an attaching layer onto the nanostructured material, wherein the nanostructured material is not self-sustaining and wherein the nanostructured material has a porosity of at least about 60%.

15. The method of claim 14, wherein providing the support comprises forming a reinforcement layer on a backing layer.

16. The method of claim 15, wherein the method further comprises a step of removing the backing layer.

17. The method of claim 14, wherein the method further comprises a step selected from the group consisting of electrospinning, nanoparticle aerosol deposition, monolayer self-assembly, layer-by-layer synthesis, sputtering, sol-gel, wet-synthesis, and spray pyrolysis.

18. A method for attaching a nanostructured material to a surface, the method comprising
   applying a layer of nanostructured material and a support to the surface,
   causing the nanostructured material to attach to the surface, and
   then removing the support;
   wherein the attachment is effected by means of an attaching layer having a thickness of less than about 1 µm and
   wherein the nanostructured material is not self-sustaining and wherein the nanostructured material has a porosity of at least about 60%.

19. The method of claim 18, wherein the causing step comprises applying heat either directly or indirectly to the attaching layer so that the attaching layer softens and/or melts so as to attach the nanostructured material to the surface.

20. The method of claim 18, wherein the method further comprises a step of removing the support after attaching the attaching layer to the surface.

* * * * *